United States Patent
Taguma

(10) Patent No.: US 7,532,354 B2
(45) Date of Patent: May 12, 2009

(54) DUPLEX TRANSFERRING APPARATUS AND IMAGE FORMING APPARATUS

(75) Inventor: Kenichi Taguma, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 902 days.

(21) Appl. No.: 11/137,640

(22) Filed: May 26, 2005

(65) Prior Publication Data

US 2005/0275896 A1    Dec. 15, 2005

(30) Foreign Application Priority Data

Jun. 14, 2004   (JP)   ............... 2004-175373

(51) Int. Cl.
*G06K 15/00*   (2006.01)
*H04N 1/04*   (2006.01)

(52) U.S. Cl. ..................... 358/1.18; 358/496

(58) Field of Classification Search ................. 358/1.1, 358/1.9, 1.11, 1.12, 1.13, 1.14, 1.15, 1.16, 358/1.17, 1.18, 496; 399/66, 104, 306, 308, 399/309, 401
See application file for complete search history.

(56) References Cited

U.S. PATENT DOCUMENTS 6,347,200 B1 * 2/2002 Shigeta et al. ............. 399/66

2005/0275896 A1   12/2005   Taguma

FOREIGN PATENT DOCUMENTS

JP          5-8948        1/1993
JP          3592488       9/2004

OTHER PUBLICATIONS

U.S. Appl. No. 11/563,544, filed Nov. 27, 2006, Taguma, et al.

* cited by examiner

*Primary Examiner*—Edward L Coles
*Assistant Examiner*—Thierry L Pham
(74) *Attorney, Agent, or Firm*—Oblon, Spivak, McClelland, Maier & Neustadt, P.C.

(57) ABSTRACT

A first-side reflected-light detector includes a first light-receiving unit that receives a first light emitted from a first light-emitting unit and reflected on a first side of a recording medium. A second-side reflected-light detector includes a second light-receiving unit that receives a second light emitted from a second light-emitting unit and reflected on a second side of the recording medium. The first-side reflected-light detector and the second-side reflected-light detector are arranged in such a manner that the first light-receiving unit is fixed at a position off from an extension line from the second light-emitting unit in an emitting direction of the second light, and the second light-receiving unit is fixed at a position off from an extension line from the first light-emitting unit in an emitting direction of the first light.

28 Claims, 8 Drawing Sheets

DUPLEX TRANSFERRING APPARATUS AND IMAGE FORMING APPARATUS

CROSS-REFERENCE TO RELATED APPLICATIONS

The present document incorporates by reference the entire contents of Japanese priority document, 2004-175373 filed in Japan on Jun. 14, 2004.

BACKGROUND OF THE INVENTION

1) Field of the Invention

The present invention relates to a duplex transferring apparatus that transfers visual images on both sides of a recording medium, and an image forming apparatus using the duplex transferring apparatus.

2) Description of the Related Art

Conventionally, an image forming apparatus using a switchback method disclosed in Japanese Patent Application Laid-Open No. H5-8948 and an image forming apparatus using a one-path method disclosed in Japanese Patent Application Laid-Open No. H11-24443 are well known as a duplex-printing image forming apparatus that forms images on both sides of a recording medium. According to the switchback method, a recording medium is allowed to pass through a transfer unit and a fixing unit to record an image on one side thereof, and then the recording medium is reversed in a reversing carrier path. The recording medium is then switched back to the transfer unit and the fixing unit, to record an image on the other side thereof. On the other hand, the one-path method uses a duplex transferring apparatus that can continuously transfer visual images on the both sides of the recording medium. By having the recording medium passed through the duplex transferring apparatus to pass through the fixing unit, images can be recorded on the both sides of the recording medium, without switching back the recording medium.

In both methods, there is a problem such that a difference in the image quality between the front and back sides of the recording medium is conspicuous. Therefore, the present inventor has made extensive study for the cause of this problem, and has found the following points. That is, the transferability of the visual image is different according to the surface characteristics of the recording medium. For example, as the surface smoothness, which is one of the surface characteristics of the recording medium, deteriorates, the transferability of the visual image with respect to the recording medium deteriorates. Furthermore, in the transfer of a transfer charger method in which it is difficult to employ the known constant current control for controlling a transfer current flowing to the transfer unit to be constant, the transferability of the visual image with respect to the recording medium deteriorates, with a decrease in the surface electrical resistance, which is one of the surface characteristics of the recording medium. It is because electric charges applied by a transfer charger are hardly held on the surface of the recording medium, thereby making it difficult to form a transfer field of a desired intensity in the transfer unit. If the surface characteristics are different on the front and the back sides of the recording medium, the transferability with respect to the first side of the recording medium and the transferability with respect to the second side of the recording medium become different from each other. Nevertheless, if the visual image is transferred under the same transfer condition with respect to the first side and the second side of the recording medium, a difference in image quality occurs between the first and the second sides. For example, degradation of image caused by insufficient transfer occurs on the surface having poor surface smoothness, or electric charges are not held well on a surface having a smaller surface electrical resistance to cause degradation of image caused by insufficient transfer on the opposite surface, thus the difference in image quality occurs between the first and the second sides.

Therefore, the applicant of the present invention is now developing an image forming apparatus including a surface characteristic detector that detects the surface characteristics of the front and the back of the recording medium individually, and a transfer-condition setting unit that sets the transfer condition with respect to the first and the second sides individually based on the detection result. In this image forming apparatus, the first transfer condition at the time of transferring the first visual image onto the first side of the recording medium is set to a condition suitable for the surface characteristics of the first side by the transfer-condition setting unit. On the other hand, the second transfer condition at the time of transferring the second visual image onto the second side of the recording medium is set to a condition suitable for the surface characteristics of the second side. Accordingly, insufficient transfer is suppressed on both first and second sides, thereby enabling suppression of a difference in image quality between the first and the second sides due to the occurrence of degradation of image quality caused by insufficient transfer on either one surface of the recording medium.

Even in this image forming apparatus, however, a difference in image quality can occur between the first and the second sides. Therefore, the present inventor made intensive study for the cause why a difference in image quality cannot be suppressed reliably with the image forming apparatus, and has found the following points. That is, in the image forming apparatus, an optical sensor unit is used as the surface characteristic detector. This optical sensor unit has a first-side reflected-light detector that detects the optical reflectance on the first side by a reflecting type photosensor, and a second-side reflected-light detector that detects the optical reflectance on the second side by the reflecting type photosensor. The optical reflectance on the surface of the recording medium has a correlation with the surface smoothness. Therefore, by detecting the optical reflectance, the surface smoothness on the first and the second sides can be detected. However, the first-side reflected-light detector and the second-side reflected-light detector are arranged at positions at which a part of light emitted from one light-emitting element can be transmitted through the recording medium and detected by the other light-receiving element. Accordingly, interference occurs between the first and the second-side reflected-light detectors, and hence the surface smoothness on the first and the second sides cannot be accurately detected. Therefore, a difference in image quality occurs between the first and the second sides.

A problem that occurs in an example, in which the optical sensor unit that detects the surface smoothness on the first and the second sides of the recording medium individually by the optical method using the reflecting type photosensor is used as the surface characteristic detector, has been explained above. However, such a problem can occur not only in this example, but also when such a detector that causes interference is used as the first side characteristic detector that detects surface characteristics of the first side and the second side characteristic detector that detects surface characteristics of the second side is used.

SUMMARY OF THE INVENTION

It is an object of the present invention to solve at least the above problems in the conventional technology.

A duplex transferring apparatus according to one aspect of the present invention, which transfers a first visual image from a first image carrier onto a first side of a recording medium and a second visual image from a second image carrier onto a second side of the recording medium, to transfer a visual image onto both sides of the recording medium, includes a first-side reflected-light detector including a first light-emitting unit that emits a first light and a first light-receiving unit that receives the first light reflected on the first side of the recording medium; a second-side reflected-light detector including a second light-emitting unit that emits a second light and a second light-receiving unit that receives the second light reflected on the second side of the recording medium; and a transfer-condition setting unit that independently sets a first transfer condition for transferring the first visual image and a second transfer condition for transferring the second visual image, based on a result of detections by the first-side reflected-light detector and the second-side reflected-light detector. The first-side reflected-light detector and the second-side reflected-light detector are arranged in such a manner that the first light-receiving unit is fixed at a position off from an extension line from the second light-emitting unit in an emitting direction of the second light-emitting unit, and the second light-receiving unit is fixed at a position off from an extension line from the first light-emitting unit in an emitting direction of the first light-emitting unit.

A duplex transferring apparatus according to another aspect of the present invention, which transfers a first visual image from a first image carrier onto a first side of a recording medium and a second visual image from a second image carrier onto a second side of the recording medium, to transfer a visual image onto both sides of the recording medium, includes a first-side current detector that detects a current generated between a first electrode and a second electrode by bringing the first electrode and the second electrode into contact with the first side of the recording medium with a predetermined distance between the first electrode and the second electrode; a second-side current detector that detects a current generated between a third electrode and a fourth electrode by bringing the third electrode and the fourth electrode into contact with the second side of the recording medium with a predetermined distance between the third electrode and the fourth electrode; and a transfer-condition setting unit that independently sets a first transfer condition for transferring the first visual image and a second transfer condition for transferring the second visual image, based on a result of detections by the first-side current detector and the second-side current detector. The first-side current detector and the second-side current detector are arranged in such a manner that a distance between the first electrode and the second electrode and a distance between the third electrode and the fourth electrode become shorter than distances between electrodes in other four combinations out of six combinations set up by selecting two electrodes from the first electrode to the fourth electrode.

A duplex transferring apparatus according to still another aspect of the present invention, which transfers a first visual image from a first image carrier onto a first side of a recording medium and a second visual image from a second image carrier onto a second side of the recording medium, to transfer a visual image onto both sides of the recording medium, includes a first-side vibration detector that detects a vibration amount of a first contact member by bringing the first contact member into contact with the first side of the recording medium; a second-side vibration detector that detects a vibration amount of a second contact member by bringing the second contact member into contact with the second side of the recording medium; and a transfer-condition setting unit that independently sets a first transfer condition for transferring the first visual image and a second transfer condition for transferring the second visual image, based on a result of detections by the first-side vibration detector and the second-side vibration detector. The first-side vibration detector and the second-side vibration detector are arranged in such a manner that a projected image of a contact area of the first contact member on the first side in a thickness direction of the recording medium does not overlap with a contract area of the second contact member on the second side.

A duplex transferring apparatus according to still another aspect of the present invention, which transfers a first visual image from a first image carrier onto a first side of a recording medium and a second visual image from a second image carrier onto a second side of the recording medium, to transfer a visual image onto both sides of the recording medium, includes two units selected from a reflected-light detector including a light-emitting unit that emits a light, and a light-receiving unit that receives the light reflected on either of the first side and the second side of the recording medium, a current detector that detects a current generated between two electrodes by bringing the two electrodes into contact with either of the first side and the second side of the recording medium with a predetermined distance between the two electrodes, and a vibration detector that detects a vibration amount of a contact member by bringing the contact member into contact with either of the first side and the second side of the recording medium; and a transfer-condition setting unit that independently sets a first transfer condition for transferring the first visual image and a second transfer condition for transferring the second visual image, based on a result of detections by the two units.

An image forming apparatus according to still another aspect of the present invention, which forms a visual image on both sides of a recording medium, includes an image forming unit that forms a first visual image on a first image carrier and a second visual image on a second image carrier; and a duplex transfer unit that transfers a first visual image from a first image carrier onto a first side of the recording medium and a second visual image from a second image carrier onto a second side of the recording medium. The duplex transfer unit includes a first-side reflected-light detector including a first light-emitting unit that emits a first light and a first light-receiving unit that receives the first light reflected on the first side of the recording medium; a second-side reflected-light detector including a second light-emitting unit that emits a second light and a second light-receiving unit that receives the second light reflected on the second side of the recording medium; and a transfer-condition setting unit that independently sets a first transfer condition for transferring the first visual image and a second transfer condition for transferring the second visual image, based on a result of detections by the first-side reflected-light detector and the second-side reflected-light detector. The first-side reflected-light detector and the second-side reflected-light detector are arranged in such a manner that the first light-receiving unit is fixed at a position off from an extension line from the second light-emitting unit in an emitting direction of the second light-emitting unit, and the second light-receiving unit is fixed at a position off from an extension line from the first light-emitting unit in an emitting direction of the first light-emitting unit.

An image forming apparatus according to still another aspect of the present invention, which forms a visual image on both sides of a recording medium, includes an image forming unit that forms a first visual image on a first image carrier and a second visual image on a second image carrier; and a duplex transfer unit that transfers a first visual image from a first image carrier onto a first side of the recording medium and a second visual image from a second image carrier onto a second side of the recording medium. The duplex transfer unit includes a first-side current detector that detects a current generated between a first electrode and a second electrode by bringing the first electrode and the second electrode into contact with the first side of the recording medium with a predetermined distance between the first electrode and the second electrode; a second-side current detector that detects a current generated between a third electrode and a fourth electrode by bringing the third electrode and the fourth electrode into contact with the second side of the recording medium with a predetermined distance between the third electrode and the fourth electrode; and a transfer-condition setting unit that independently sets a first transfer condition for transferring the first visual image and a second transfer condition for transferring the second visual image, based on a result of detections by the first-side current detector and the second-side current detector. The first-side current detector and the second-side current detector are arranged in such a manner that a distance between the first electrode and the second electrode and a distance between the third electrode and the fourth electrode become shorter than distances between electrodes in other four combinations out of six combinations set up by selecting two electrodes from the first electrode to the fourth electrode.

An image forming apparatus according to still another aspect of the present invention, which forms a visual image on both sides of a recording medium, includes an image forming unit that forms a first visual image on a first image carrier and a second visual image on a second image carrier; and a duplex transfer unit that transfers a first visual image from a first image carrier onto a first side of the recording medium and a second visual image from a second image carrier onto a second side of the recording medium. The duplex transfer unit includes a first-side vibration detector that detects a vibration amount of a first contact member by bringing the first contact member into contact with the first side of the recording medium; a second-side vibration detector that detects a vibration amount of a second contact member by bringing the second contact member into contact with the second side of the recording medium; and a transfer-condition setting unit that independently sets a first transfer condition for transferring the first visual image and a second transfer condition for transferring the second visual image, based on a result of detections by the first-side vibration detector and the second-side vibration detector. The first-side vibration detector and the second-side vibration detector are arranged in such a manner that a projected image of a contact area of the first contact member on the first side in a thickness direction of the recording medium does not overlap with a contract area of the second contact member on the second side.

An image forming apparatus according to still another aspect of the present invention, which forms a visual image on both sides of a recording medium, includes an image forming unit that forms a first visual image on a first image carrier and a second visual image on a second image carrier; and a duplex transfer unit that transfers a first visual image from a first image carrier onto a first side of the recording medium and a second visual image from a second image carrier onto a second side of the recording medium. The duplex transfer unit includes two units selected from a reflected-light detector including a light-emitting unit that emits a light, and a light-receiving unit that receives the light reflected on either of the first side and the second side of the recording medium, a current detector that detects a current generated between two electrodes by bringing the two electrodes into contact with either of the first side and the second side of the recording medium with a predetermined distance between the two electrodes, and a vibration detector that detects a vibration amount of a contact member by bringing the contact member into contact with either of the first side and the second side of the recording medium; and a transfer-condition setting unit that independently sets a first transfer condition for transferring the first visual image and a second transfer condition for transferring the second visual image, based on a result of detections by the two units.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained below in detail with reference to the accompanying drawings.

Figure 1:
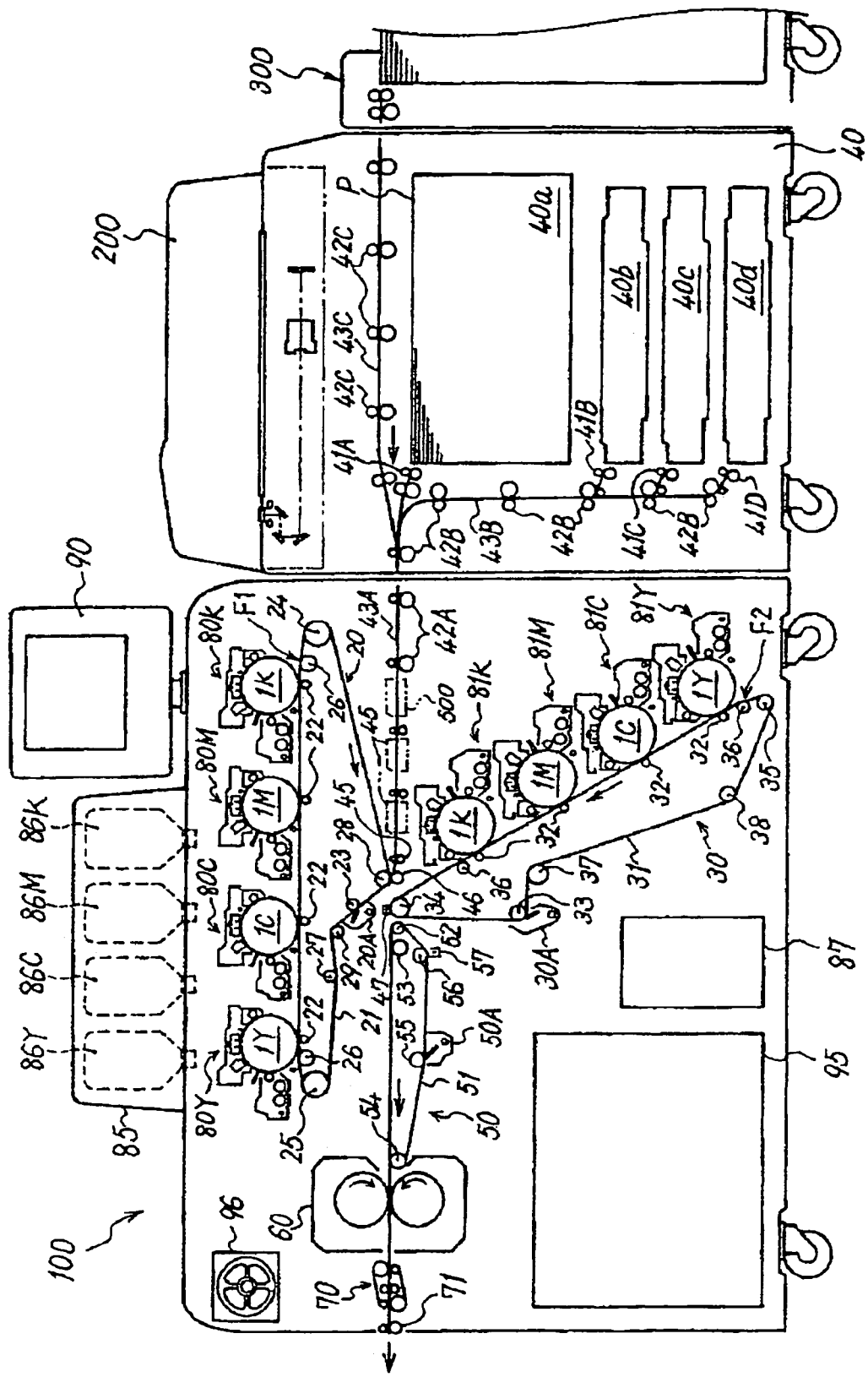
FIG. 1 is a schematic of a copying machine according to an embodiment of the present invention.

FIG. 1 is a schematic block diagram of a copying machine according to an embodiment of the present invention. The copying machine includes a printer unit 100, an operation and display unit 90, a feeder 40, an automatic image reader 200, a paper supply unit 300, and the like.

The printer unit 100 includes a first image forming unit arranged above a carrier path 43A and a second image forming unit arranged below thereof. The first image forming unit includes a first transfer unit 20 having a first intermediate transfer belt 21 that endlessly moves in the direction of arrow in FIG. 1. The second image forming unit includes a second transfer unit 30 having a second intermediate transfer belt 31 that endlessly moves in the direction of arrow in FIG. 1. Four first process units 80Y, 80M, 80C, and 80K are arranged above the upper stretched surface of the first intermediate transfer belt 21. On the other hand, four second process units 81Y, 81M, 81C, and 81K are arranged on the side of the side stretched surface of the second intermediate transfer belt 31. The subscripts Y, M, C, and K added to the number of these first and the second process units indicate the color of toner to be handled respectively. The respective equipment in the process unit are denoted by the same subscripts.

Each process unit (80Y, 80M, 80C, 80K, 81Y, 81M, 81C, and 81K) respectively includes a photoconductor (1Y, 1M, 1C, and 1K) as a latent image carrier. The photoconductors 1Y, 1M, 1C, and 1K in the first process units 80Y, 80M, 80C, and 80K are arranged with an equal interval, and respectively come in contact with the upper stretched surface of the first intermediate transfer belt 21 at least at the time of image formation. Hereinafter, the belt surface coming in contact therewith in this manner is referred to as a first image-receiving surface.

On the other hand, the photoconductors 1Y, 1M, 1C, and 1K in the second process units 81Y, 81M, 81C, and 81K are arranged with an equal interval, and respectively come in contact with the side stretched surface of the second intermediate transfer belt 31 at least at the time of image formation. Hereinafter, the belt surface coming in contact therewith in this manner is referred to as a second image-receiving surface.

The first intermediate transfer belt 21 is in a horizontally long posture, taking a space in the horizontal direction rather than the vertical direction by a plurality of rollers, and is laid across in a tensioned condition, with the first image-receiving surface extended substantially horizontally. The first process units 80Y, 80M, 80C, and 80K are arranged in parallel substantially horizontally with each other, so as to abut against the substantially horizontal first image-receiving surface.

On the other hand, the second intermediate transfer belt 31 is in a vertically long posture, taking a space in the vertical direction rather than the horizontal direction by a plurality of rollers, and is laid across in a tensioned condition, with the second image-receiving surface inclined from upper left to lower right in FIG. 1. The second process units 81Y, 81M, 81C, and 81K are arranged so as to abut against the inclined second image-receiving surface and to be arranged in an inclined posture from upper left to lower right, on the left side of the second intermediate transfer belt 31 in FIG. 1.

Figure 2:
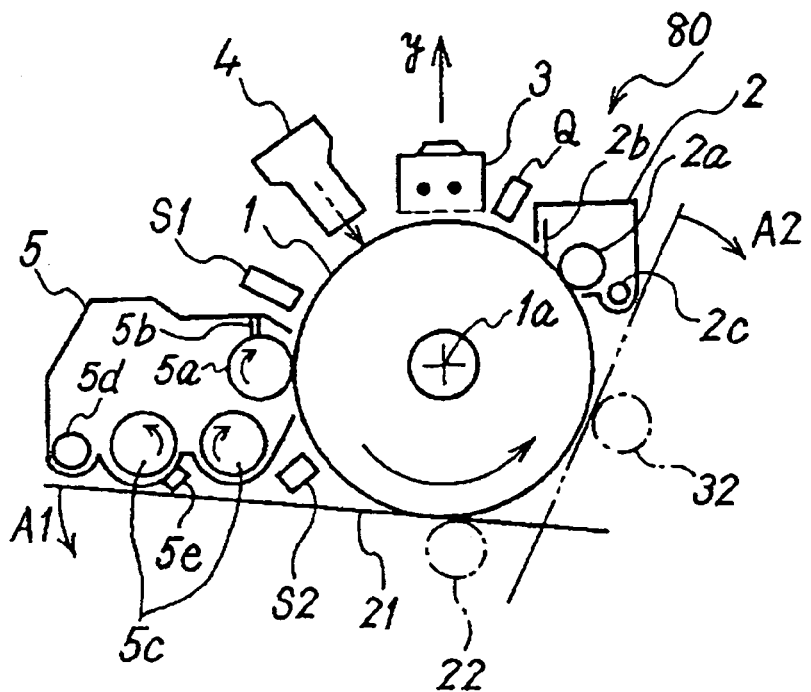
FIG. 2 is an enlarged block diagram of one of four first process units in a printer unit of the copying machine.

FIG. 2 is an enlarged block diagram of one of the four first process units 80Y, 80M, 80C, and 80K. Since the four first process units 80Y, 80M, 80C, and 80K have the same configuration but different in color to be handled, the subscript Y, M, C, and K added to "80" is omitted in FIG. 2. The photoconductor 1 is rotated by a drive unit (not shown) in the counterclockwise direction in FIG. 2 at the time of operation of the printer unit (100). A scorotron charger 3 as a charger, an exposing unit 4, a developing unit 5, a cleaning unit 2, an imaging member such as a light discharging unit Q, a potential sensor S1, an image sensor S2, and the like are arranged around the photoconductor 1.

The drum-like photoconductor 1 is coated with an organic photoconductor layer (OPC), which is a photoconductive material to an aluminum cylindrical surface, for example, having a diameter of about 30 to 120 millimeters. The drum-like photoconductor 1 can be coated with amorphous silicon (a-Si). Furthermore, the photoconductor 1 cannot be a drum-like shape, but can be a belt form.

The cleaning unit 2 has a cleaning brush 2a, a cleaning blade 2b, a collecting member 2c, and the like, and removes the toner remaining on the surface of the photoconductor after having passed through a primary transfer nip described later.

The scorotron charger 3 is for uniformly charging the surface of the rotated photoconductor 1, for example, to a negative polarity. A corotron charger can be used instead of the scorotron charger as the charging unit that performs the uniform charging. A method, in which a charged bias member to which a charging bias is applied is brought into contact with the surface of the photoconductor 1, can be used.

The exposing unit 4 optically scans the surface of the photoconductor 1 after having been uniformly charged, with light generated based on the image data corresponding to one color of the respective colors, to form an electrostatic latent image on the surface of the photoconductor 1. In the shown example, as the exposing unit 4, the one formed of a light emitting diode (LED) array and an imaging element is used, and a laser scan method using beams modulated according to the image data to be formed and using a laser light source, a polygon mirror, and the like can be used.

The developing unit 5 is of a two-component development type for developing an electrostatic latent image on the photoconductor 1 by using a two-component developer containing a toner and a magnetic carrier. In the developing unit 5, the two-component developer is carried in the depth direction in FIG. 2, while being stirred by two transfer screws 5c. The transfer directions of the developer by these two transfer screws 5c are opposite to each other. For example, if the transfer direction of the developer by the transfer screw 5c on the left in FIG. 2 is from the other side to this side in FIG. 2, the transfer direction of the developer by the transfer screw 5c on the right side is from this side to the other side in FIG. 2. The two-component developer carried to the end in the depth direction in FIG. 2 of the developing unit 5 by the former transfer screw 5c is delivered to the latter transfer screw 5c. In the process of being stirred and carried from the end toward the opposite end, a part of the developer is carried on the development roller 5b. Furthermore, the two-component developer that are not carried or returned from the development roller 5b to the right transfer screw 5c is delivered to the left transfer screw 5c at the opposite end. Thus, the two-component developer is circulated and carried in the developing unit 5. As the developing unit 5, the one of a one-component development type using a one-component developer containing the toner as a main component but not containing the magnetic carrier can be used.

A developing roller 5a has a sleeve, which is a nonmagnetic cylinder made of stainless steel, aluminum, or the like, and rotated in the clockwise direction in FIG. 2 by a driving unit (not shown), and a magnet roller fixed therein so as not to rotate together with the sleeve. The magnet roller has a plurality of magnetic poles divided into the circumferential directions thereof inside of the sleeve. The two-component developer carried by the right transfer screw 5c in FIG. 2 is attracted by a magnetic force generated by the magnet roller and drawn up on the surface of the rotated sleeve. The developer then passes a regulatory position, which is a position opposite to the blade 5b, before being carried to a development area opposite to the photoconductor 1, with the rotation together with the surface of the sleeve.

The blade 5b is arranged so that the edge thereof abuts against the surface of the sleeve with a predetermined gap. The thickness of the two-component developer is then regulated in a predetermined thickness, when the two-component developer on the surface of the sleeve passes the regulatory position directly below.

The two-component developer having the regulated thickness is carried to the development area, which is the position opposite to the photoconductor 1, with the rotation of the sleeve. The electrostatic latent image formed by the charge attenuated by optical scanning with respect to the surface of the photoconductor 1 uniformly charged to the negative polarity is rubbed against the two-component developer on the surface of the sleeve in the development area. The electrostatic latent image is then developed with any one color of Y, M, C, or K due to adhesion of the toner having the negative polarity, which is the same polarity as that of the latent image. In the first process unit 80, a so-called reversal development is carried out. Accordingly, the visual image of any one color of Y, M, C, or K is formed on the photoconductor 1.

A spherical or indeterminate toner obtained by a conventionally well-known method is used as the toner. A toner having a volume average particle size equal to or smaller than 20 micrometers, and preferably, from 4 to 10 micrometers inclusive is preferable. Furthermore, a magnetic carrier obtained by a conventionally well-known method is used as the magnetic carrier, and the one having a volume average particle size of from about 25 to 60 micrometers is preferable.

The two-component developer having consumed the toner in the development area returns to the developing unit 5, with the rotation of the sleeve. The two-component developer is separated from the surface of the sleeve due to the influence of a repulsive magnetic field formed by the magnetic poles of the magnet rollers, adjacent to each other and of the same pole, returned onto the right transfer screw transfer screw 5c, and delivered to the left transfer screw transfer screw 5c.

A toner density sensor 5e is arranged below the left transfer screw 5c, which detects the magnetic permeability of the two-component developer carried by the left transfer screw 5c. Since the magnetic permeability of the two-component developer has a correlation with the toner density, the toner density sensor 5e detects the toner density.

When a controller (not shown) determines that the density of the two-component developer is less than a predetermined threshold based on an output signal from the toner density sensor 5e, the controller drives one of the eight toner supply units (not shown) corresponding to the two-component developer for predetermined time. The eight toner supply units correspond to either one of the four developing unit in the first process units (80Y, 80M, 80C, and 80K) or the four developing unit in the second process units (81Y, 81M, 81C, and 81K). The eight toner supply units are connected to either one of four toner bottles Y, M, C, or K (86Y, 86M, 86C, and 86K in FIG. 1) detachably set in a bottle storage unit 85 above the printer unit (100). A predetermined color toner is supplied onto the left transfer screw 5c in the corresponding developing unit from the connected toner bottle. Accordingly, the toner density of the two-component developer having consumed the toner due to the development is recovered. As the toner supply unit having such a configuration, the one in which the toner in the toner bottle is attracted and carried to the developing unit by an attraction by a known monopump is desirable. According to this method, since there is little restriction on the installation place of the toner bottle, it is advantageous to the space allocation therein. Furthermore, since the toner can be replenished appropriately, it is not necessary to provide a large toner storage space in the developing unit 5, thereby enabling a small size of the developing unit 5.

Figure 3:
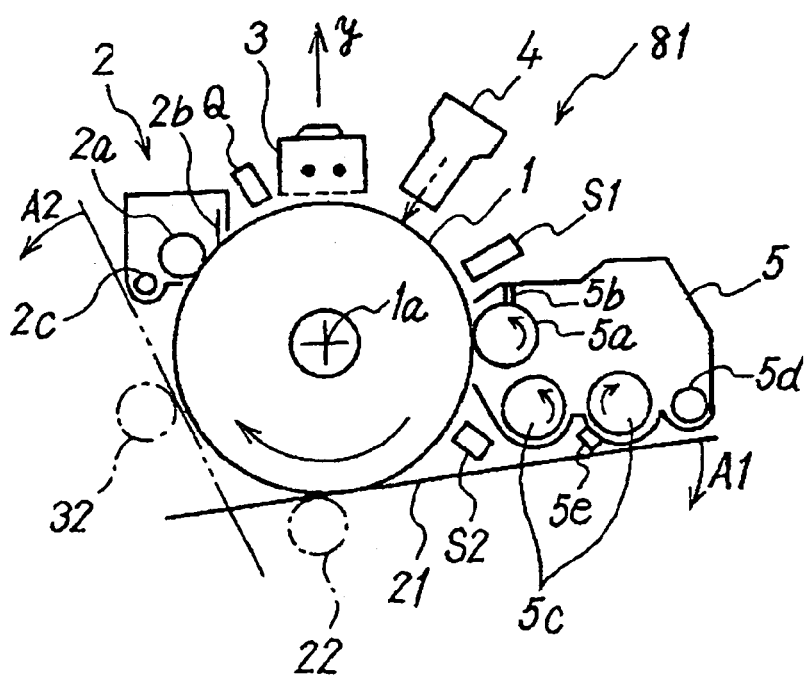
FIG. 3 is an enlarged block diagram of one of four second process units in the printer unit.

FIG. 3 is an enlarged block diagram of one of the four second process units 81Y, 81M, 81C, and 81K. The four second process units (81Y, 81M, 81C, and 81K) have the same configuration with a difference in the color to be handled, and the components of the second process unit 81 is the same as those of the first process unit (80), but the rotation direction of the photoconductor 1 is different. However, both of the first and the second process units have a symmetrical shape with respect to the y-axis going through the rotation axis 1a of the photoconductor 1. This shape is an important matter, relating to the arrangement of the members provided around the photoconductor 1. Specifically, a connection method between the joint with the printer unit 100, for example, a joint with the driving unit, an electrical joint, a toner supply unit, and the toner discharge unit is taken into consideration. Accordingly, the first process units (80Y, 80M, 80C, and 80K) and the second process units (81Y, 81M, 81C, and 81K) can have compatibility. Therefore, it is not necessary to produce the developing unit, the cleaning unit, and the parts individually for the first process units and the second process units, and as a result, the efficiency in the production of the parts and management of parts increases, thereby enabling a reduction in the whole cost.

The first image forming unit includes a plurality of first process units (80Y, 80M, 80C, and 80K) and the first transfer unit 20. The second image forming unit includes a plurality of second process units (81Y, 81M, 81C, and 81K) and the second transfer unit 30. The first transfer unit 20 and the second transfer unit 30 form a duplex transferring apparatus in the printer unit 100.

In the first transfer unit 20, a first intermediate transfer belt 21 is laid across a plurality of rollers 22 (four), 23, 24, 25, and 26 (two), and 27, 28, and 29 in a tensioned condition, so as to come in contact with the photoconductors 1Y, 1M, 1C, and 1K in the first process units 80Y, 80M, 80C, and 80K. In the first transfer unit 20, due to this contact, a primary transfer nip for Y, M, C, and K for superposing and transferring the Y, M, C, and K visual images on the photoconductors 1Y, 1M, 1C, and 1K onto the first intermediate transfer belt 21 is formed. The first intermediate transfer belt 21 endlessly moves in the clockwise direction in FIG. 1, while forming these four primary transfer nips. In the respective primary transfer nips, either one of the four primary transfer rollers 22, to which the primary transfer bias is applied by a power source (not shown), puts the first intermediate transfer belt 21 between the photoconductors 1Y, 1M, 1C, and 1K and the primary transfer roller. The respective color visual images are superposed on and primary-transferred to the first intermediate transfer belt 21 at the respective primary transfer nips due to the influence of the primary transfer bias and a nip pressure. The first visual image is formed on the first intermediate transfer belt 21, which is an image carrier, due to the superposition.

A cleaning unit 20A is provided on the outer circumference of the first intermediate transfer belt 21 at a position opposite to the roller 23. The cleaning unit 20A wipes out the toner remaining on the surface of the first intermediate transfer belt 21 after having passed the respective primary transfer nips, and foreign matter such as paper dust. Members relating to the first intermediate transfer belt 21 are integrally formed as the first transfer unit 20, being detachable with respect to the printer unit 100.

On the other hand, in the second transfer unit 30, a second intermediate transfer belt 31 is laid across a plurality of rollers 32 (four), rollers 33, 34, 35, and 36 (two) in a tensioned condition, so as to come in contact with the photoconductors 1Y, 1M, 1C, and 1K. In the second transfer unit 30, due to this contact, a primary transfer nip for Y, M, C, and K for superposing and transferring the Y, M, C, and K visual images on the photoconductors 1Y, 1M, 1C, and 1K onto the second intermediate transfer belt 31 is formed. The second intermediate transfer belt 31 endlessly moves in the counterclockwise direction in FIG. 1, while forming these four primary transfer nips. In the respective primary transfer nips, either one of the four primary transfer rollers 32, to which the primary transfer bias is applied by a power source (not shown), puts the second intermediate transfer belt 31 between the photoconductors 1Y, 1M, 1C, and 1K and the primary transfer roller. The respective color visual images are superposed on and primary-transferred to the second intermediate transfer belt 31 at the respective primary transfer nips due to the influence of the primary transfer bias and the nip pressure. The second visual image is formed on the second intermediate transfer belt 31, which is an image carrier, due to the superposition.

A cleaning unit 30A is provided on the outer circumference of the second intermediate transfer belt 31 at a position opposite to the roller 33. The cleaning unit 30A wipes out unnecessary toner remaining on the surface of the second intermediate transfer belt 31 after having passed the respective primary transfer nips, and foreign matter such as paper dust. Members relating to the second intermediate transfer belt 31 are also integrally formed as the second transfer unit 30, being detachable with respect to the printer unit 100.

The two intermediate transfer belts (21 and 31) are, for example, belts in which a resin film or a rubber forms a substrate having a thickness of from 50 to 600 micrometers. The two intermediate transfer belts exhibit electrical resistivity that enables transfer of the visual image, which is a visible image carried by the photoconductor 1, onto the belt surface electrostatically by the primary transfer bias applied to the primary transfer rollers (22 and 32). The example of such a first intermediate transfer belt includes one in which carbon is dispersed in polyamide, and the volume resistivity thereof is adjusted to about $10^6$ to $10^{12}$ ohm centimeters, in which a belt lateral-shift stopping rib for stabilizing the drive of the belt is provided at the end on one side or on both sides of the belt.

As the four primary transfer rollers 22, which is the primary transfer unit in the first transfer unit 20 and the four primary transfer rollers 32, which is the primary transfer unit in the second transfer unit 30, for example, the one having the following configuration can be used. That is, the roller is obtained by coating the surface of a metal roller as a core metal with conductive rubber, in which a bias is applied to the core metal from a power source (not shown). In this embodiment, a material in which carbon is dispersed in urethane rubber is used as the conductive rubber material, and the volume resistivity thereof is adjusted to about $10^5$ ohm centimeters.

The printer unit 100 can output a monochrome image by using only the K toner. When the monochrome image is to be output, the process units 80Y, 80M, and 80C for Y, C, and M in the first transfer unit 20 are not used. Not only the process units 80Y, 80M, and 80C are not operated, but also a mechanism for maintaining these process units 80Y, 80M, and 80C contactless with the first intermediate transfer belt 21 is provided. An internal flame (not shown) for supporting the roller 26 and the first transfer roller 22 is provided, to support these rollers rotatably about a certain point. By rotating these rollers in a direction away from the photoconductor, only the photoconductor 1K is brought into contact with the first intermediate transfer belt 21, to execute the imaging process, thereby forming a monochrome image by the block toner. This configuration is advantageous in view of improving the service life of the photoconductor. Also in the second transfer unit 30, the process units 81Y, 81M, and 81C are made away from the second intermediate transfer belt 31, at the time of output of a monochrome image.

A secondary transfer roller 46 as an abutting roller is arranged on the outer circumference of the first intermediate transfer belt 21, so as to put the first intermediate transfer belt 21 between the support roller 28 laid across in a tensioned condition while supporting the first intermediate transfer belt 21 on the backside thereof and the secondary transfer roller 46. Accordingly, a secondary transfer nip at which the first intermediate transfer belt 21 and the secondary transfer roller 46 abut against each other is formed in the first transfer unit 20. The area from the support roller 28 to the secondary transfer roller 46 via the secondary transfer nip forms a first transfer portion in the duplex transferring apparatus. The transfer condition in the first transfer portion is a first transfer condition at the time of transferring the first visual image on the first intermediate transfer belt 21 as the image carrier onto a first side of transfer paper P.

The secondary transfer roller 46 is obtained by coating the surface of a metal roller as a core metal with a conductive rubber, in which a secondary transfer bias is applied to the core metal from a secondary transfer bias supply (not shown). In the conductive rubber, the volume resistivity is adjusted to about $10^7$ ohm centimeters due to the dispersion of carbon therein.

Figure 10:
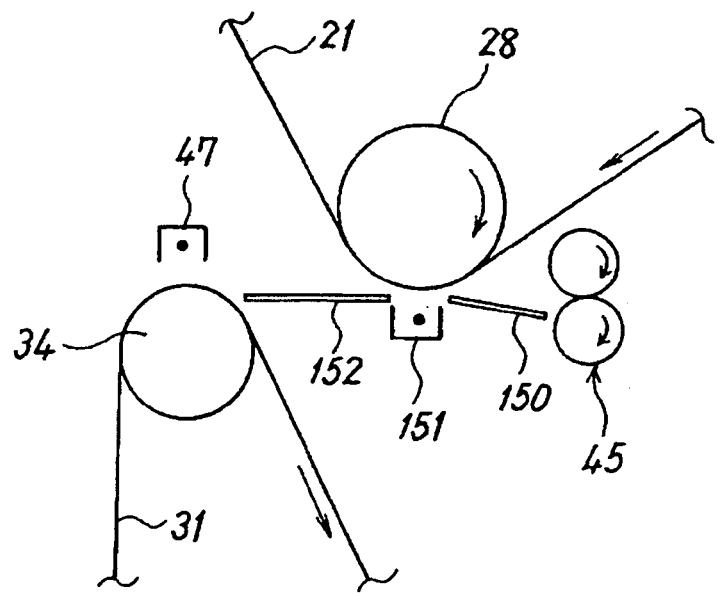
FIG. 10 is an enlarged block diagram of a transfer portion in a copying machine according to a third example of the embodiment.
Figure 12:
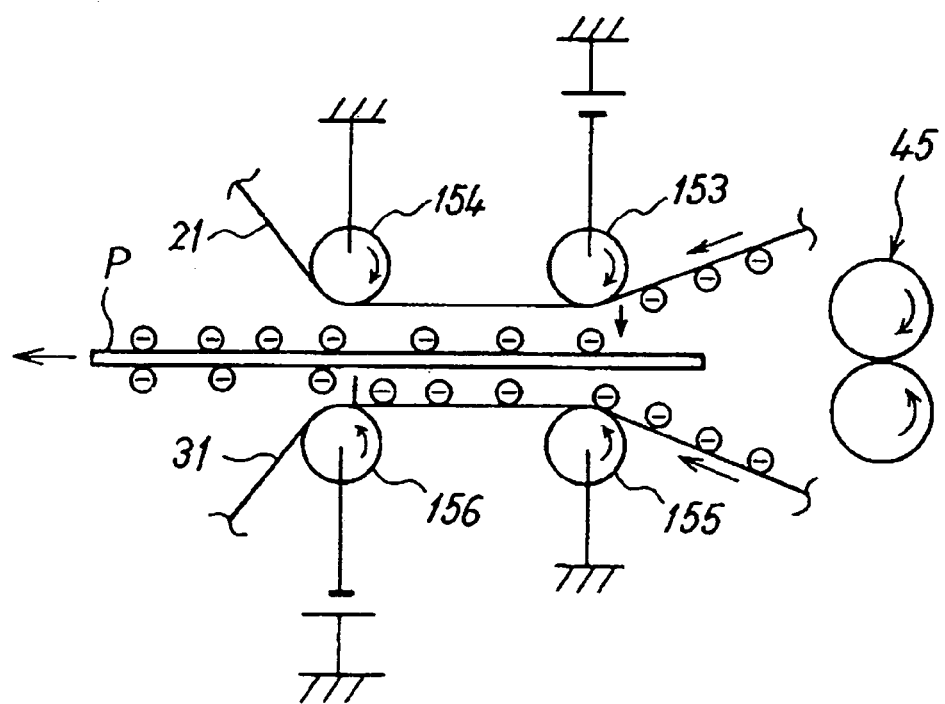
FIG. 12 is an enlarged diagram of a transfer unit of a copying machine according to a fourth example of the embodiment.
Figure 13:
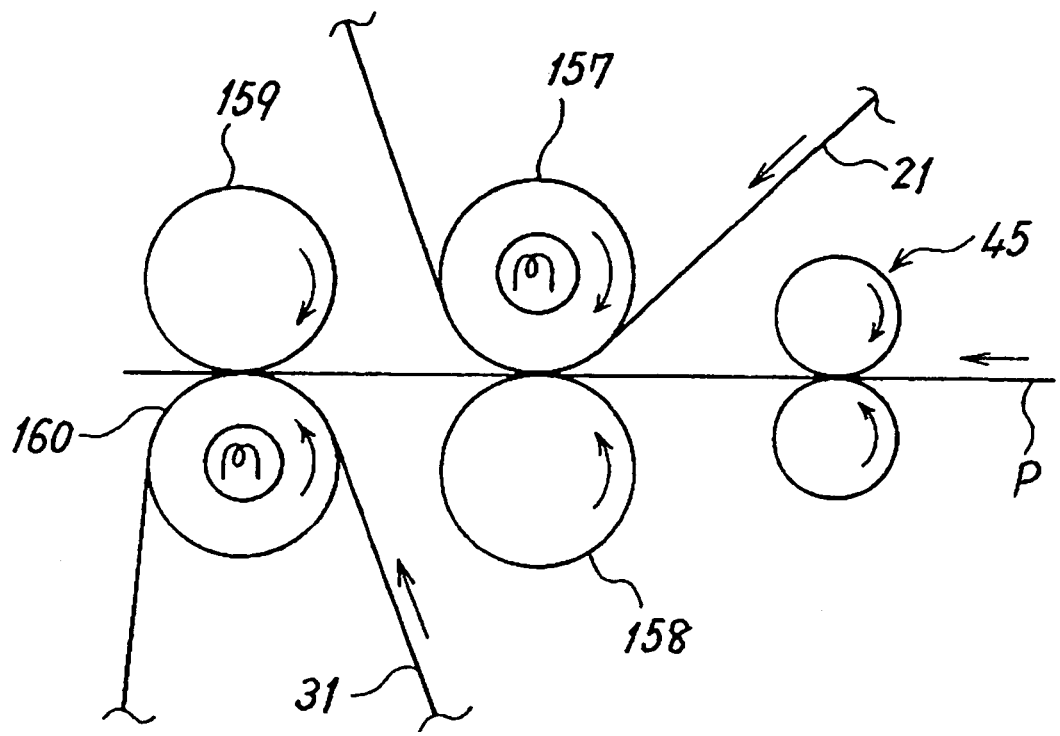
FIG. 13 is an enlarged block diagram of a transfer unit of a copying machine according to a fifth example of the embodiment.

A resist roller pair 45 is arranged on the right side in FIGS. 10, 12, and 13 of the secondary transfer nip. The resist roller pair 45 temporarily suspends the rotation of the both rollers, after having put the transfer paper P between the rollers, which is transmitted from the feeder 40 arranged on the right side of the printer unit 100 in FIG. 1. The transfer paper P is sent out toward the secondary transfer nip, at a timing capable of synchronizing with the four-color visual image, which is the superposed visual image on the first intermediate transfer belt 21. The four-color visual image is stuck on the first side (surface facing upward in FIG. 1), which is one of the surfaces of the transfer paper P, at the secondary transfer nip. The four-color visual image on the first intermediate transfer belt 21 is secondarily batch-transferred onto the first side due to the influence of the secondary transfer bias and the nip pressure. The transfer paper P having passed the secondary transfer nip is separated from the first intermediate transfer belt 21 and the secondary transfer roller 46 and delivered to the second intermediate transfer belt 31.

In the second transfer unit 30, the position where the second intermediate transfer belt 31 is spanned over an upper stretching roller 34 is an upper stretched surface of the second intermediate transfer belt 31. A transfer charger 47 as a charging unit is arranged so as to face the upper stretched surface via a predetermined space above the upper stretched surface. The area from the transfer charger 47 to the upper stretching roller 34 via the predetermined space forms a second transfer portion by the second transfer unit 30. The transfer condition in the second transfer portion becomes a second transfer condition at the tome of transfer of the second visual image on the second intermediate transfer belt 31 as the image carrier onto a second side of the transfer paper P.

The transfer charger 47 is of a known type, in which a thin wire of tungsten or gold is used as a discharge electrode and held by a casing, and a transfer current is applied to the discharge electrode from a power source (not shown). The four-color visual image on the second intermediate transfer belt 31 is secondarily batch-transferred onto the second side of the transfer paper P by applying electric charge emitted from the transfer charger 47 onto the first side, while allowing the transfer paper P to pass through between the second intermediate transfer belt 31 and the transfer charger 47. The second transfer bias and the electric charge applied by the transfer charger 47 are of the positive polarity opposite to the toner polarity.

The feeder 40, in which the transfer paper is stored in a state ready to be fed, is arranged on the right side of the printer unit 100 in FIG. 1. A plurality of feed cassettes is arranged, for example, a feeder (tray) 40a storing a large number of transfer paper is arranged on the upper stage, and feed cassettes 40b, 40c, and 40d are arranged in three stages below the feeder 40a, so that the transfer paper can be pulled out to this side (on the operation surface side) at a right angle with respect to the page. Transfer paper of different types is respectively stored in the feed tray 40a and feed cassettes 40b, 40c, and 40d. Among these, the transfer paper at the uppermost position is selectively fed and separated by corresponding feed and separation units 41A to 41D, and only one transfer paper is reliably carried to the carrier paths 43B and 43A by a plurality of carrier roller pairs 42B.

In the carrier path 43A, a pair of resist rollers 45 is provided for timing to feed the transfer paper P to the first transfer portion and the second transfer portion in the duplex transferring apparatus. Furthermore, a lateral registration correction mechanism 44 is provided in the carrier path 43A, for registering the position of the transfer paper P in a direction at a right angle with respect to the transport direction of the transfer paper P to a normal position. The representative example of the lateral registration correction mechanism 44 has the following configuration. That is, the lateral registration correction mechanism includes a lateral reference guide (not shown) and a skew roller pair, and the transfer paper is slid and carried so that the end of the transfer paper in the lateral direction is pressed against the reference guide, and the transfer paper is registered at a predetermined position. The reference guide is shifted to and arranged at a predetermined position, according to the size of the transfer paper. The lateral registration correction mechanism 44 can be of a jogger type, which is formed of a regulation member that pushes the opposite sides of the transfer paper for a short period of time and for a plurality of times from the sides with respect to the transport direction of the transfer paper, to register the transfer paper to a predetermined position.

The transfer paper P is carried from the resist roller pair 45 to the first transfer portion, in which the secondary transfer nip is formed by the first intermediate transfer belt 21 and the secondary transfer roller 46 abutting against each other. Thereafter, the transfer paper P is carried to the second transfer portion in which the second intermediate transfer belt 31 faces the transfer charger 47.

In the feeder 40, the transfer paper P discharged from the feed tray 40a arranged at the uppermost position of the feed trays is carried substantially horizontally and straight with respect to the carrier path 43A in the printer unit 100, without being bent. Therefore, if stored in the feed tray 40a, even thick transfer paper P or a hardboard having high rigidity can be fed reliably to the carrier path 43A in the printer unit 100. For the feed tray 40a, it is desired to employ air feed using a vacuum mechanism so that reliable feed is possible even when transfer paper of various properties is stored. Though not shown, a sensor for detecting the transfer paper P is provided at key points of the carrier path 43A, as a trigger of various signals based on the presence of the transfer paper P.

A second feed path 43C is provided above the feed cassette 40a arranged at the uppermost position. To the second feed path 43C, the transfer paper P can be fed from a second feeder 300 arranged on the right side of the feeder 40 in FIG. 1.

On the left side of the second transfer unit 30 in FIG. 1, a carrier unit 50 that endlessly moves in the counterclockwise direction in FIG. 1 is arranged, while spanning a carrier belt 51 over a plurality of stretching rollers 52, 53, 54, 55, and 56. The transfer paper P discharged from the second transfer portion in the second transfer unit 30 is received on the carrier belt 51 at a position where the carrier belt 51 is spanned over the reception roller 52, which is one of the stretching rollers. At a timing earlier than this reception, electric charge is applied to the front surface of the carrier belt 51 by an electrostatic attraction charger 57. Due to the application of the electric charge, the carrier unit 50 can electrostatically attract the transfer paper P discharged from the second transfer portion to the front surface of the carrier belt 51.

The carrier belt 51, on which the transfer paper P is electrostatically attracted on the front surface thereof, carries the transfer paper P from the right side to the left side in FIG. 1, with the endless movement thereof. The transfer paper P is then delivered to the fixing unit 60, which is a fixing unit arranged on the left side of the carrier unit 50 in FIG. 1. At a timing earlier than the delivery thereof, electric charge is applied to the transfer paper P electrostatically attracted on the front surface of the carrier belt 51 by a separation charger 58. Due to the application of electric charge, the transfer paper P electrostatically attracted on the front surface of the carrier belt 51 can be easily separated from the belt. The transfer paper P is separated from the belt, which is going to change the moving direction abruptly along the curvature of the separation roller 54, at a position where the belt is spanned over the separation roller 54, which is arranged closest to the fixing unit 60, and is handed over to the fixing unit 60.

For the fixing unit 60, a type having a heater in the fixing roller, a type driving a heated belt, or a type employing induction heating can be used. In FIG. 1, the one in which the transfer paper P is heated from the opposite sides thereof, at a fixing nip formed by allowing two fixing rollers to abut against each other, to fix the first visual image and the second visual image is employed. In order to equalize the hue and glossiness of the images on the opposite sides of the transfer paper P, the two fixing rollers have the same belt material, hardness, surface nature, and the like. Furthermore, various parameters of the fixing unit 60 are controlled so as to produce optimum fixing conditions with respect to the respective surfaces, according to whether the image is a full color image or a monochrome image, or the image is to be formed on one side or on both sides.

The transfer paper P subjected to the fixing processing by the fixing unit 60 is sent out to a discharge path. In the discharge path, a cooling roller pair 70 having a cooling function is arranged to stabilize the unstable state of the toner at an early stage. For the cooling roller pair 70, a roller having a heat pipe structure having a radiator can be used. The transfer paper P cooled by the cooling roller pair 70 is ejected to and stacked in an ejection stack unit 75 provided on the left side of the printer unit 100 by an ejection roller pair 71. The ejection stack unit adopts a mechanism for moving a receiving member up and down according to the stack level by an elevator mechanism (not shown), so as to enable stacking of a large quantity of transfer paper. Furthermore, the transfer paper P can be carried to another post processor after having passed the ejection stack unit 75. As the other post processor, a variety of units for binding, such as drilling, cutting, folding, and stapling can be provided.

On the upper surface of the printer unit 100, toner bottles 86Y, 86M, 86C, and 86K for respective colors, in which unused toner is respectively stored, are detachably housed in a bottle housing 85. The bottle housing 85 is located on the upper surface of the printer unit 100 and on the other side as seen from the operation direction, and hence, since a flat portion is ensured on this side of the upper surface of the printer unit 100, the flat portion can be used as a work table. The toner can be supplied to the respective developing unit according to need by the toner supply units. In this embodiment, in the first image forming unit and the second image forming unit arranged up and down, the toner is supplied from a common toner bottle to the developing unit handling the same color toner, but a different toner bottle can be used for each image forming unit. The toner bottle 86K for the black toner, which is consumed a lot, can have particularly a large capacity.

A keyboard and the like are provided in the operation and display unit 90 provided on the upper surface of the printer unit 100, so that conditions for image formation can be input. Various types of information can be displayed on the display unit including a display and the like, thereby facilitating exchange of information between an operator and the printer unit 100.

A waste toner storage unit 87 provided in the printer unit 100 is connected to the cleaning unit 2 and cleaning unit 20A and 30A for the intermediate transfer belt, and fully collects and stores therein foreign matter such as the waste toner and paper dust sent from the cleaning unit. Since the cleaning unit (2, 20A, 30A, and 50A) does not have the waste toner storage unit of a large capacity, the cleaning unit can be made small and the operability in dumping the waste toner is improved. Timing for dumping of the toner in the waste toner storage unit 87 or replacement of the bottle is warned by using a full sensor (not shown).

Various power sources and control substrates are protected by a sheet metal frame and stored in a controller 95 provided in the printer unit 100. The inside of the image forming apparatus becomes high temperature due to the heat by the fixing unit 60 and heat generation from the electrical equipment, but as a measure for this problem, a fan F is provided to prevent degradation of function due to the heat in the inner members. The fan F is coupled with a heat radiation unit in the cooling roller pair 70, to ensure the cooling effect of the cooling roller pair 70.

An automatic document feeder (ADF) 200 that reads an image on the document, while automatically feeding the document by a known technique is provided above the feeder 40, and the information read by the automatic document feeder 200 is transmitted to the controller 95. Based on the read information, the printer unit 100 is driven and controlled, to output an image the same as the document. Image information can be transmitted to the printer unit 100 from a personal computer (not show) or the like, to output an image corresponding to the image information. Furthermore, image information transmitted from a telephone line (not shown) can be transmitted to the printer unit 100 to output an image corresponding to the image information. The second paper supply unit 300 is arranged for supplying the transfer paper P to the feeder 40, on the right side of the feeder 40 in FIG. 1.

The operation of the printer unit 100 at the time of single-sided recording for forming a full-color image on one side of the transfer paper will be explained.

There are basically two methods for single-sided recording, and selection is possible. One is a method of secondarily batch-transferring the four-color visual image transferred onto the first intermediate transfer belt 21 on the first side of the transfer paper. The other is a method of secondarily batch-transferring the four-color visual image transferred onto the second intermediate transfer belt 31 on the second side of the transfer paper. In the case that the image data is for a plurality of pages, it is convenient to control the imaging sequence so that the pages become complete on the ejection stack unit 75. Therefore, the former method that can sort out the pages in order by recording the image data from the last page will be explained.

When the printer unit 100 is driven, the first intermediate transfer belt 21 and the photoconductors 1Y, 1M, 1C, and 1K in the first process unit 80Y, 80M, 80C, and 80K are rotated. At the same time, the second intermediate transfer belt 31 moves endlessly, but the photoconductors 1Y, 1M, 1C, and 1K in the second process unit 81Y, 81M, 81C, and 81K are separated from the second intermediate transfer belt 31, so as not to rotate. Image formation by the first process unit 80Y is then started. The light corresponding to the image data for yellow emitted from the LED is irradiated onto the surface of the photoconductor 1Y uniformly charged by the charger 3, by the operation of the exposing unit 4 including the LED array and the imaging element, to form an electrostatic latent image.

The electrostatic latent image is developed to a Y visual image by the developing unit in the first process unit 81Y for yellow, and electrostatically primary-transferred onto the first intermediate transfer belt 21 at the primary transfer nip for yellow. The formation of the electrostatic latent image, the development, and the primary transfer operation are sequentially performed likewise on the photoconductors 1M, 1C, and 1K in exact timing. The M, C, and K visual images are sequentially superposed on and primary-transferred onto the Y visual image on the first intermediate transfer belt 21, at the primary transfer nip for M, C, and K. By this superposed primary transfer, a four-color visual image is formed on the first intermediate transfer belt 21.

On the other hand, the feeder 40 sends out the transfer paper corresponding to the image data from the feed tray 40a or the feed cassette 40b, 40c, or 40d therein by one of the feed and separation units 41A to 41D. The feeder 40 then carries the transfer paper to the carrier path 43C in the printer unit 100 by the carrier roller pairs 42B and 42C, and the transfer paper is sent to the lateral registration correction mechanism 44.

The lateral registration correction mechanism 44 is an inclination correction unit that corrects the inclination of the posture from the carrier direction of the transfer paper P on the way to be carried from the feeder 40 as a recording medium supply unit to the duplex transferring apparatus (the first and the second transfer units). The inclination of the posture of the transfer paper P is corrected by making the guide plate pair arranged in the direction to the page orthogonal to the transport direction abut against the opposite ends of the transfer paper P orthogonal to the transport direction, on the upstream side in the transport direction than the resist roller pair 45. The two guide plates of the guide plate pair are movable in the direction to the page orthogonal to the transport direction, and by shifting the guide plates matched with the width of the fed transfer paper P, the distance between the plates can be adjusted to the width of the transfer paper P.

The transfer paper P whose posture inclination is corrected by the lateral registration correction mechanism 44 reaches the resist roller pair 45, and sent out to the first transfer portion with the timing adjusted. The four-color visual image on the first intermediate transfer belt 21 is then secondarily batch-transferred onto the first side at the secondary transfer nip in the first transfer portion. The front surface of the first intermediate transfer belt 21 having passed the secondary transfer nip is subjected to cleaning by the belt cleaning unit 20A so that the residual toner after transfer is removed.

In the respective first process units 80Y, 80M, 80C, and 80K, the residual toner remaining on the photoconductor 1Y, 1M, 1C, and 1K after having passed the primary transfer nip is cleaned by the cleaning unit (2). The cleaning unit (2) is, as shown in FIG. 2, for removing the residual toner from the first intermediate transfer belt 21 by the cleaning brush 2a and the cleaning blade 2b. The foreign matter such as the removed toner is sent to the collecting unit 87 by the collecting member 2c. The sensors S1 and S2 detect whether the surface potential after the exposure of the photoconductor surface and the toner density adhering to the photoconductor surface after the development process are appropriate, and issues information to a controller (not shown) for setting and controlling the imaging conditions appropriately. Furthermore, the residual electric charge is discharged from the surface of the photoconductor 1 after cleaning by a discharger Q to initialize the photoconductor surface.

The transfer paper, on the first side of which the four-color visual image is secondary-transferred at the secondary transfer nip in the first transfer portion, is delivered to the second intermediate transfer belt 31 in the second transfer unit 30, and sent to the carrier unit 50. The transfer paper P is then delivered from the carrier unit 50 to the fixing unit 60, but prior to the delivery, electric charge is applied to the transfer paper P by the separation charger 58. Due to the application of the electric charge, the transfer paper electrostatically attracted to the second intermediate transfer belt 31 can be easily separated.

In the fixing unit 60, the respective color toners in the full-color image carried on the first side of the transfer paper P are melted and mixed by heating. Since the toner is held only on the first side of the transfer paper P, the heat energy required for fixing is less than that at the time of duplex recording in which the toners are held on the both sides. The controller 95 optimally controls the power used by the fixing unit 60 based on the image. Even after the fixing processing is performed, the visual image is rubbed by the guide member and the like in the carrier path, and hence a part of the image can be lost or mixed, until the toner is completely fixed on the transfer paper P. To prevent this problem, the transfer paper having passed the fixing unit 60 is directed to the cooling roller pair 70 provided as the cooling unit.

In this copying machine, since the imaging sequence is programmed so that the last page comes at the bottom of the stack and the first page is stacked at the top in the ejection stack unit 75, the pages are sorted out in the ejection stack unit 75. Since the ejection stack unit 75 descends with an increase in the number of transfer paper P to be ejected, the transfer paper can be stacked reliably and orderly, and the order of pages is not mixed. Instead of directly stacking the recorded transfer paper in the ejection stack unit 75, drilling can be performed, or the transfer paper can be carried to the post-processor such as a sorter, a collator, a stapler, or a folder.

In another method for forming an image on one side of the transfer paper, it is different from the above method in that image formation is not carried out in the first process units 80Y, 80M, 80C, and 80K, and that the image data is formed in an image in order of from the first page for sorting the pages. However, it is basically the same as the process for single-sided recording described above, and hence the explanation thereof is omitted.

When an image signal is input to the printer unit 100, Y, M, C, and K visual images are formed on the photoconductor 1Y, 1M, 1C, and 1K in the first process units 80Y, 80M, 80C, and 80K explained in the operation for single-sided recording. These visual images are sequentially superposed on and primary-transferred onto the first intermediate transfer belt 21 at the primary transfer nip for Y, M, C, and K. In parallel with this process, Y, M, C, and K visual images are formed on the photoconductor 1Y, 1M, 1C, and 1K in the second process units 81Y, 81M, 81C, and 81K. These visual images are sequentially superposed on and primary-transferred onto the second intermediate transfer belt 31 at the primary transfer nip for Y, M, C, and K. Thus, the four-color visual image is respectively formed on the first intermediate transfer belt 21 and the second intermediate transfer belt 31.

The unit interval between the second process units 81Y, 81M, 81C, and 81K is smaller than the unit interval between the first process units 80Y, 80M, 80C, and 80K. Accordingly, in the second transfer unit 30, the superposition by primary transfer finishes faster than in the first transfer unit 20.

The transfer paper P carried from the resist roller pair 45 to the secondary transfer nip in the first transfer portion in exact timing is delivered to the second transfer portion, after the four-color visual image on the first intermediate transfer belt 21 is secondary-transferred onto the first side thereof. The four-color visual image on the second intermediate transfer belt 31 is then secondary-transferred onto the second side thereof in the second transfer portion in which the second intermediate transfer belt 31 and the transfer charger 47 face each other with a predetermined gap.

The transfer paper P on which the full-color image is respectively formed on the both sides is delivered to the fixing unit 60 via the carrier unit 50. The transfer paper P is subjected to the fixing processing by heating and pressurizing in the fixing unit 60, and the visual images on the both sides are respectively melt and mixed. Furthermore, after going through the cooling roller pair 70 and the ejection roller 71, the transfer paper P is ejected onto the ejection stack unit 75.

When duplex recording is performed on a plurality of transfer paper, the imaging sequence is controlled so that the image on the first page faces downward and stacked in the ejection stack unit 75. Accordingly, when the transfer paper is taken out from the ejection stack unit 75 and put upside down, the pages are sorted out so that the first page is at the top and then the second page follows, and so on. Such control of the imaging sequence and the control for increasing the power to be input to the fixing unit than at the time of single-sided recording are executed by the controller 95.

While an example in which the full-color recording is executed has been explained above for the single-sided recording operation and the duplex recording operation, monochrome recording using only the black toner is also possible. When the necessity for maintenance and parts replacement occurs, an outside cover (not shown) is opened, to perform maintenance.

In the copying machine having the configuration explained above, a visual image forming unit is formed by a combination of the first image forming unit and the second image forming unit. Accordingly, while forming a first visual image on the surface of the first intermediate transfer belt 21 as the image carrier, a second visual image is formed on the surface of the second intermediate transfer belt 31 as the image carrier.

Figure 4:
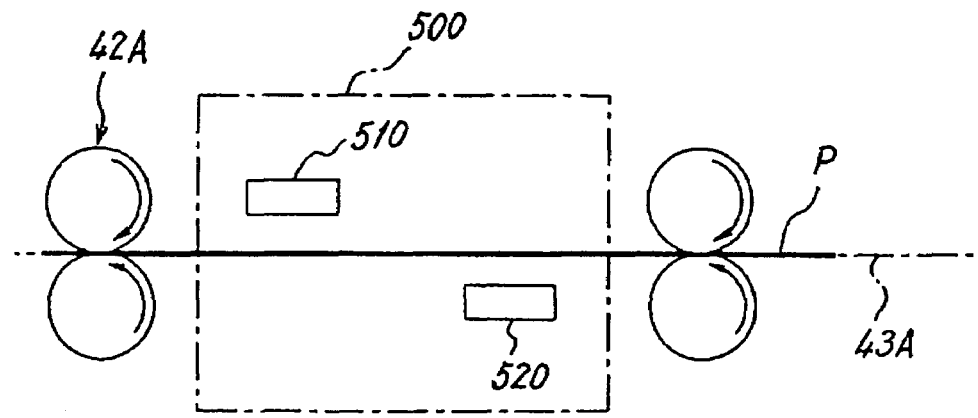
FIG. 4 is a an enlarged block diagram of a surface characteristic detector in the printer unit.

A surface characteristic detector 500 is arranged on the upstream side in the transport direction than the lateral registration correction mechanism 44 in the carrier path 43A in the printer unit 100. The surface characteristic detector 500 has, as shown in FIG. 4, a first detector 510 and a second detector 520 for individually detecting the surface characteristics of the first side (a surface facing upward in FIG. 4) and the second side (a surface facing downward in FIG. 4) of the transfer paper P as the recording medium. The first detector 510 as a first side characteristic detector and the second detector 520 as a second side characteristic detector are arranged at positions not facing each other, putting the carrier path 43A as a recording medium carrier path therebetween.

The transfer paper P carried in the carrier path 43A, put between the rollers of the carrier roller pair 42A, sequentially passes right above the second detector 520 and right below the first detector in the surface characteristic detector 500. When the transfer paper P passes right above the second detector 520, the surface characteristics of the second side is detected. When the transfer paper P passes right below the first detector 510, the surface characteristics of the first side are detected.

Figure 5:
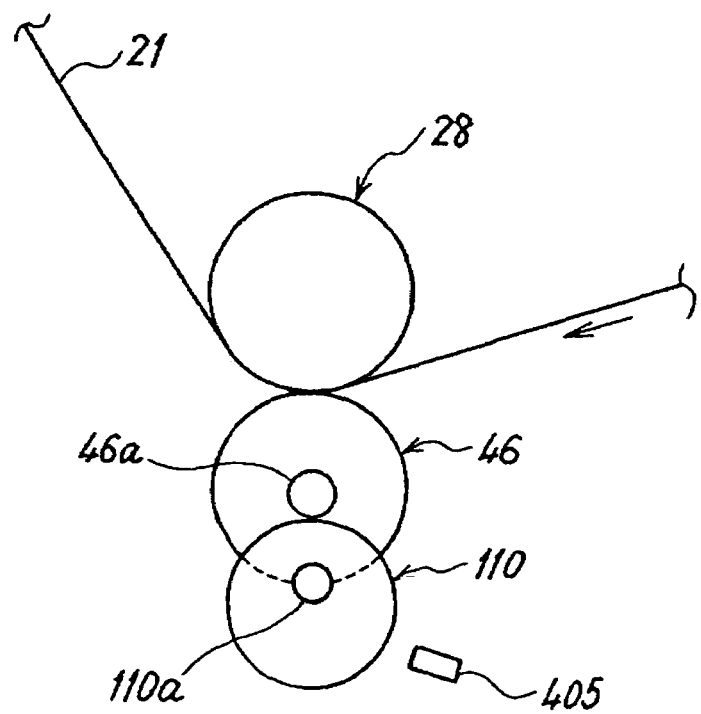
FIG. 5 is an enlarged block diagram of a first transfer portion in the printer unit.

FIG. 5 is an enlarged block diagram of the first transfer portion in the duplex transferring apparatus. In FIG. 5, the circumference of an eccentric cam 110 abuts against a shaft 46a of the secondary transfer roller 46. The secondary transfer roller 46 is energized toward the position where the first intermediate transfer belt 21 is spanned over the support roller 28 by the eccentric cam 110, to form the secondary transfer nip. When the eccentric cam 110 is rotated about an axis of swing 110a by a cam motor (not shown), the energizing force by the eccentric cam 110 at the secondary transfer nip changes according to the angle of rotation. Accordingly, the pressure at the secondary transfer nip, namely, the transfer pressure changes. At a predetermined position on the circumference of the eccentric cam 110, a reference mark (not shown) by a mirror finish is provided. The reference mark is detected by a cam photosensor 405 formed of a reflecting type photosensor arranged near the eccentric cam 110. Based on the detection timing of the reference mark by the cam photosensor 405, an angle for suspending the rotation of the eccentric cam 110 is determined, and the transfer pressure is set corresponding to the angle for suspending the rotation. Thus, in the copying machine, the transfer pressure can be changed as the first transfer condition, which is the transfer condition in the first transfer portion.

A conductive rubber is coated on the surface of the roller unit of the secondary transfer roller 46. Accordingly, the roller unit of the secondary transfer roller 46 can be elastically deformed. On the other hand, as the support roller 28 that puts the first intermediate transfer belt 21 between the secondary transfer roller 46 and itself in the first transfer portion, a metal roller is used, which cannot be elastically deformed. Therefore, at the secondary transfer nip in the first transfer portion, the softer secondary transfer roller 46 elastically deforms so that the support roller 28 encroaches therein. As the thrust increases, in other words, as the transfer pressure increases, the encroaching amount increases. The length of the secondary transfer nip in the paper transport direction increases, to increase the transfer time in the first transfer portion. Accordingly, in the copying machine, the transfer time can be changed as the first transfer condition.

A secondary transfer bias is applied to the secondary transfer roller 46, by a secondary transfer bias supply (not shown). At the secondary transfer nip, the electrostatic force acting on the first visual image on the first intermediate transfer belt 21 is largely affected by the intensity of the secondary transfer field formed at the secondary transfer nip. The intensity of the secondary transfer field depends on the transfer current value at the secondary transfer nip, rather than the voltage value of the secondary transfer bias. With an increase in the transfer current value, the intensity of the secondary transfer field increases. In the case of constant voltage control for making the voltage value of the secondary transfer bias constant, if the electrical resistivity of the first intermediate transfer belt 21 changes with fluctuations in temperature and humidity, the secondary transfer current value changes therewith. Accordingly, the intensity of the secondary transfer bias becomes unstable. In the present copying machine, however, the secondary transfer current value flowing into the support roller 28 from the secondary transfer bias roller 46 via the first intermediate transfer belt 21 is detected by a secondary transfer current detector (not shown). By adjusting the voltage value of the secondary transfer bias so that the detection result by the secondary transfer current detector approaches a predetermined current target value, the secondary transfer current value can be stabilized near the current target value. Furthermore, by changing the current target value, the secondary transfer current value generated stably in the first transfer portion can be changed. Therefore, in the copying machine, the intensity of the secondary transfer field can be also changed as the first transfer condition.

Figure 6:
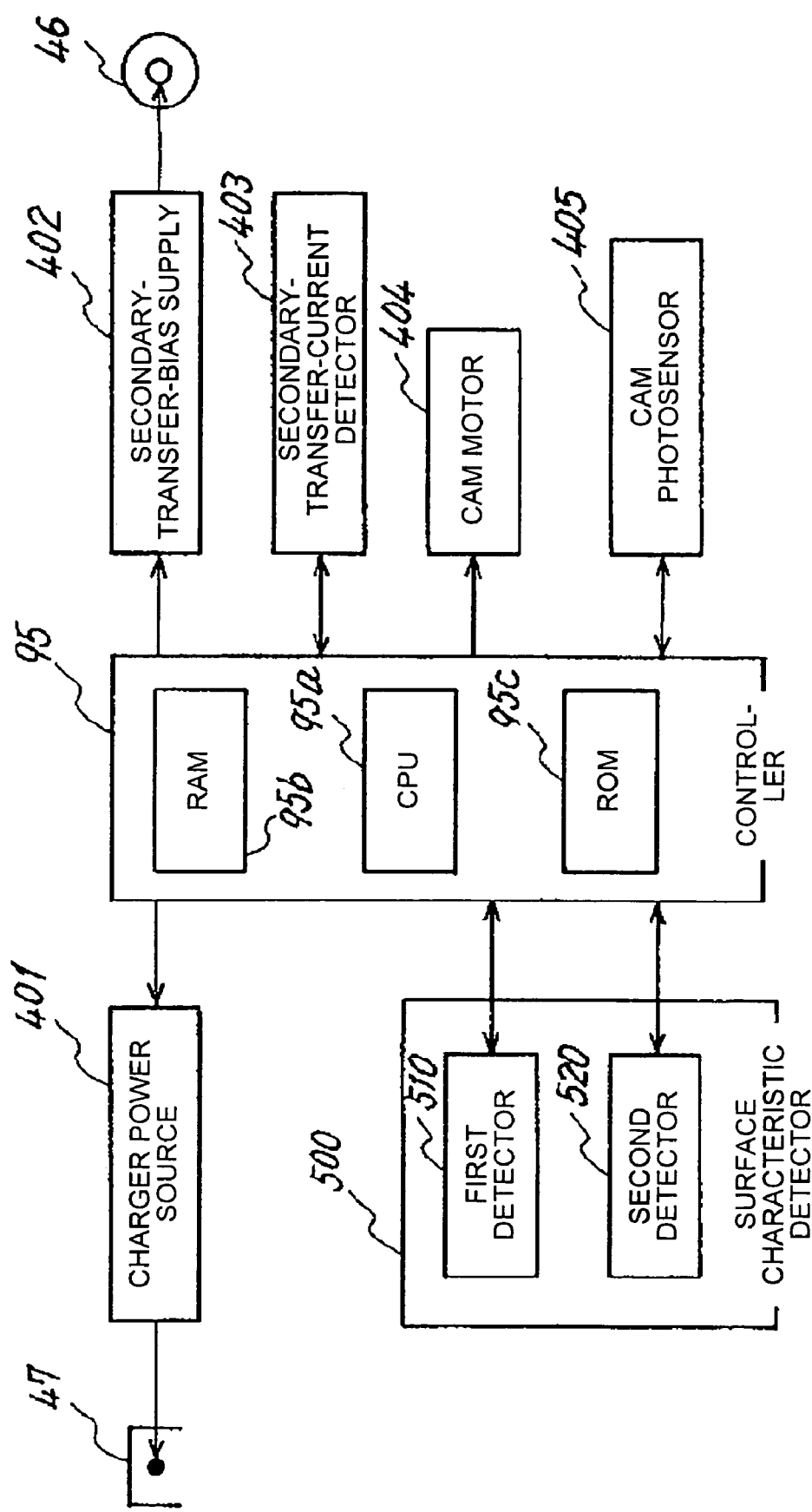
FIG. 6 is a block diagram of a part of an electric circuit in the printer unit.

FIG. 6 is a block diagram of a part of an electric circuit in the printer unit 100 of the copying machine. In FIG. 6, the controller 95 is for controlling the whole printer unit, and includes a central processing unit (CPU) 95a as an operation unit, a random access memory (RAM) 95b and a read only memory (ROM) 95c as a recording unit. To the controller 95 are connected a charger power source 401, a secondary transfer bias supply 402, a secondary transfer current detector 403, a cam motor 404, a cam photosensor 405, and the surface characteristic detector 500.

The charger power source 401 is for supplying a voltage to the transfer charger (47 in FIG. 1) in the second transfer portion, and by changing the supplied voltage value based on a control signal from the controller 95, the applied amount of charge by the transfer charger is changed. When the applied amount of charge changes, the transferability of the second visual image in the second transfer portion changes. That is, in the copying machine, the applied amount of charge with respect to the transfer paper can be changed as a second transfer condition, which is the transfer condition in the second transfer portion.

The secondary transfer bias supply 402 is for supplying the secondary transfer bias to the secondary transfer roller (46 in FIG. 1) in the first transfer portion. The secondary transfer current detector 403 is for detecting a secondary transfer current value at the secondary transfer nip in the first transfer portion. The controller 95 controls an output voltage value from the secondary transfer bias supply 402 so that the detection result by the secondary transfer current detector 403 approaches a predetermined current target value, thereby performing the constant current control.

The cam motor 404 is for rotating the eccentric cam (110 in FIG. 5) via a drive transmission system (not shown). By the operation of the cam motor 404, the angle for suspending the rotation of the eccentric cam changes, thereby changing the transfer pressure and the transfer time in the first transfer portion. The angle for suspending the rotation of the eccentric cam is determined based on the detection result by the cam photosensor 405.

The controller 95 generates a control signal to be transmitted to the secondary transfer bias supply 402 and the cam motor 404, respectively, based on the detection result of the first side of the transfer paper by the first detector 510 in the surface characteristic detector 500. The controller 95 then sets the current target value used for the constant current control and the transfer pressure at the secondary transfer nip to values suitable for the surface characteristics of the first side. Accordingly, the first transfer condition in the first transfer portion becomes the condition suitable for the surface characteristics of the first side.

The controller 95 also generates a control signal to be transmitted to the charger power source 401, based on the detection result of the second side of the transfer paper by the second detector 520 in the surface characteristic detector 500. The controller 95 then sets the applied amount of charge to the transfer paper by the transfer charger (47 in FIG. 1) to a value suitable for the surface characteristics of the second side of the transfer paper. Accordingly, the second transfer condition in the second transfer portion becomes the condition suitable for the surface characteristics of the second side.

In such a configuration, the transfer-condition setting unit is formed by the combination of the controller 95, the charger power source 401, the secondary transfer bias supply 402, the secondary transfer current detector 403, the cam motor 404, and the cam photosensor 405. This transfer-condition setting unit sets the first transfer condition at the time of transferring the first visual image and the second transfer condition at the time of transferring the second visual image, respectively independently, based on the detection result of the surface characteristic detector 500. The transfer-condition setting unit reduces insufficient transfer both on the first and the second sides, by transferring the first and the second visual images to the first and the second sides under the condition suitable for the surface characteristics thereof. Accordingly, a difference in image quality between the first and the second sides resulting from degradation of the image quality due to insufficient transfer on either one surface of the transfer paper can be reduced.

In the copying machine, as shown in FIG. 4, as the surface characteristic detector 500, the one having the first detector 510 and the second detector 520 at positions not facing each other, but putting the carrier path 43A therebetween, is used. The both detectors are arranged at positions shifted from positions at which the both detectors interfere with each other most strongly. In such a configuration, such a situation is prevented that a signal such as an optical signal or an electric signal generated from one detector is detected by another detector via the transfer paper P. Accordingly, deterioration in the detection accuracy of the surface characteristics due to the interference between the both detectors can be suppressed, thereby reliably reducing a difference in the image quality on the front and back sides of the transfer paper P. A specific example of positions at which these detectors interfere with each other most strongly is different according to the type of the detector, and hence, it will be explained in detail in the respective examples below.

Figure 7:
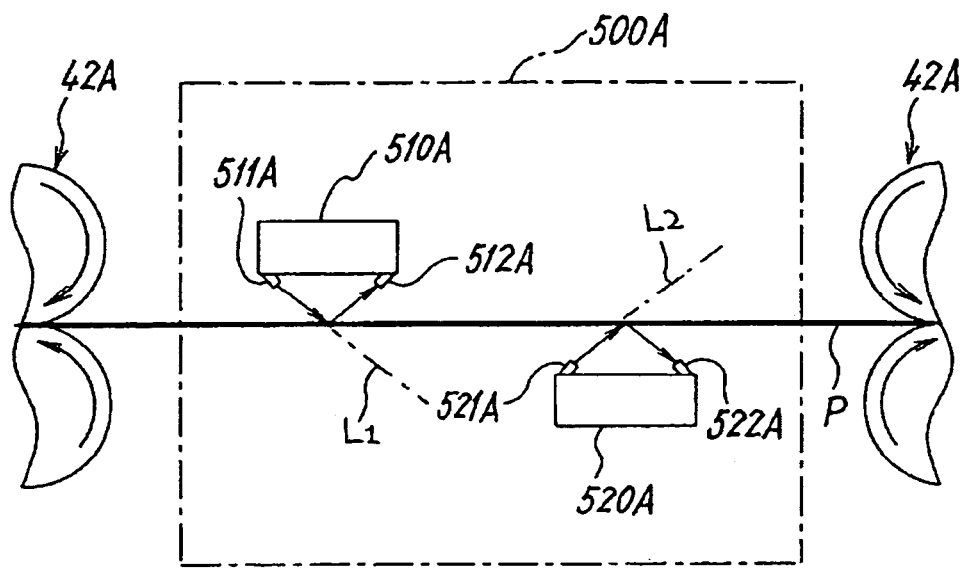
FIG. 7 is an enlarged block diagram of an optical sensor unit used for a copying machine according to a first example of the embodiment.

FIG. 7 is an enlarged block diagram of an optical sensor unit 500A as a surface smoothness detector used for a copying machine according to a first example of the embodiment. The optical sensor unit 500A that can detect the surface smoothness is used as the surface characteristic detector. In the optical sensor unit 500A, a reflecting type photosensor is used for a first detector 510A, and a second detector 520A, respectively. Since the configuration of the both detectors is the same, only the first detector 510A will be explained. The first detector 510A includes a light-emitting element 511A and a light-receiving element 512A, and the light emitted from the light-emitting element 511A is irradiated onto the first side of the transfer paper P. The light regularly reflected by the first side is detected by the light-receiving element 512A, and a signal corresponding to the optical reflectance (amount of light reception and amount of light emission) on the first side is transmitted to a controller from the light-receiving element 512A. The optical reflectance on the first side correlates with the surface smoothness on the first side. Therefore, the first detector 510A can detect the surface smoothness on the first side by detecting the optical reflectance on the first side. Likewise, the second detector 520A detects the surface smoothness on the second side of the transfer paper P. The regular reflection stands for light reflected at the same angle as that on a mirror finished surface, of a plurality of reflected light reflected at various angles on an optically irradiated surface. On the other hand, the light reflected at an angle different from that on the mirror finished surface is referred to as irregular reflection light (diffuse reflection light). Among the various kinds of reflected light, the light amount of the regular-reflected light increases most on the surface having relatively good surface smoothness.

When a detector formed of a reflection type photosensor (510A, 520A) shown in FIG. 7 is respectively used as the first detector 510 and the second detector 520, the position at which these detectors interfere with each other most strongly is a position described below. That is, the position is where the light-receiving element 522A in the second detector 520A is positioned on an extension line L1 of the optical axis of the light emitted from the light-emitting element 511A in the first detector 520A. It is because when a part of the light emitted from the light-emitting element 511A transmits through the transfer paper Transfer paper P, the transmitted light volume becomes the largest at a position on the optical axis of the light before being reflected on the paper. Accordingly, in the copying machine, as shown in FIG. 7, the light-receiving element 522A of the second detector 520A is positioned at a position deviated from the extension line L1 of the optical axis of the light emitted from the light-emitting element 511A of the first detector 510A.

Even if the light-receiving element 512A of the first detector 510A is positioned on an extension line L2 of the optical axis of the light emitted from the light-emitting element 521A of the second detector 520A, the interference between the both detectors becomes the largest. Therefore, as shown in FIG. 7, in the copying machine, the light-receiving element 512A of the first detector 510A is positioned at a position deviated from the extension line L2 of the optical axis of the light emitted from the light-emitting element 521A of the second detector 520A.

Figure 8:
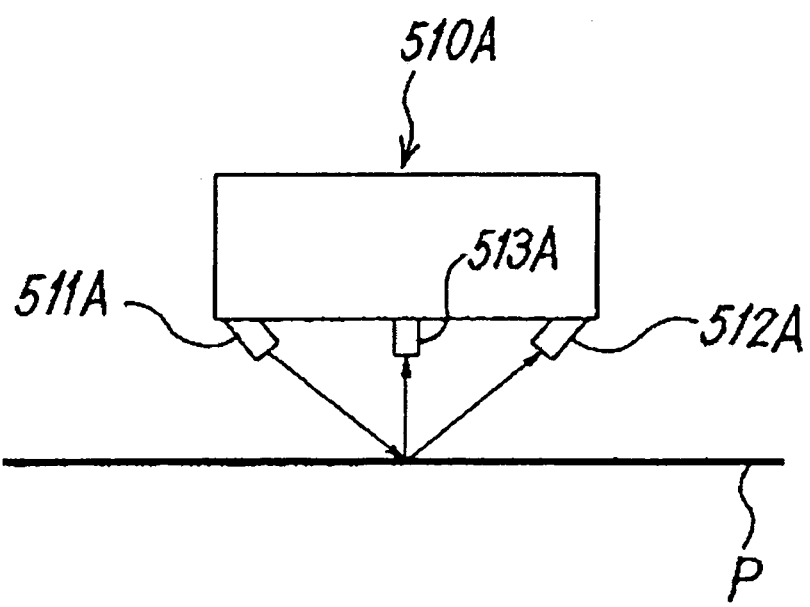
FIG. 8 is a an enlarged block diagram of a modification example of the optical sensor unit.

As the first detector 510A, a detector having a supplementary light-receiving element 513A as shown in FIG. 8, which detects the diffused reflection can be used, other than the light-receiving element 512A that detects the regular reflection. Thus in the first detector 510A, the surface smoothness can be detected more accurately by detecting the optical reflectance of the regular reflection and the optical reflectance of the diffused reflection. The same detector can be used for the second detector 520A. When the detector having such a configuration of is used, the supplementary light-receiving element 523A of the second detector 520A is also required to be positioned at a position deviated from the extension line L1 of the optical axis of the light emitted from the light-emitting element 511A of the first detector 510A. The supplementary light-receiving element 512A of the first detector 510A is also required to be positioned at a position deviated from the extension line of the optical axis of the light emitted from the light-emitting element 521A of the second detector 520A.

An example of the relation between the surface smoothness on the first side of the transfer paper P and the first transfer condition in the copying machine is shown Table 1 below.

TABLE 1

| Beck's smoothness on first side [sec] | Coefficient of current target value | Coefficient of transfer pressure |
|---|---|---|
| 60 or more | 0.80 | 1 |
| 57 to 59 | 0.85 | 1 |
| 54 to 56 | 0.90 | 1 |
| 51 to 53 | 0.95 | 1 |
| 50 | 1 | 1 |
| 42 to 49 | 1.05 | 1 |
| 34 to 41 | 1.10 | 1.1 |
| 26 to 33 | 1.15 | 1.2 |
| 20 to 25 | 1.20 | 1.3 |
| Less than 20 | 1.25 | 1.3 |

The Beck's smoothness (JIS P8119) in Table 1 indicates that as its value becomes smaller, the smoothness deteriorates. Furthermore, the coefficient of the current target value is a coefficient to be multiplied to the current target value, used at the time of control of the constant current. By this multiplication, the current target value and the intensity of the secondary transfer field are changed. The coefficient of transfer pressure is a coefficient to be multiplied to the transfer pressure target value at the secondary transfer nip. The controller (400) suspends the rotation of an eccentric cam (110) at a rotation angle at which the transfer pressure corresponding to a predetermined transfer pressure target value can be demonstrated, based on an output signal from a photosensor (405) for the cam. At this time, the transfer pressure at the secondary transfer nip, and consequently, a nip length is changed by correcting the transfer pressure target value by multiplication of the coefficient of transfer pressure in Table 1.

The transferability of the visual image to the transfer paper P decreases as the surface smoothness of the transfer paper P deteriorates, when the transfer conditions are fixed in the same content. As shown in Table 1, as the surface smoothness on the first side of the transfer paper deteriorates (as the Beck's smoothness becomes smaller), the current target value is multiplied by a larger coefficient of current target value. Accordingly, as the surface smoothness on the first side deteriorates, a lager transfer current is generated at the secondary transfer nip in the first transfer portion to reduce insufficient transfer of the first visual image due to deterioration of the surface smoothness.

In the copying machine, as the surface smoothness on the first side of the transfer paper deteriorates, a transfer pressure target value is multiplied by a lager coefficient of transfer pressure. Accordingly, as the surface smoothness on the first side deteriorates, a larger transfer pressure is generated at the secondary transfer nip, to reduce insufficient transfer of the first visual image due to deterioration of the surface smoothness.

An example of the relation between the surface smoothness on the second side of the transfer paper P and the second transfer condition in the copying machine is shown in Table 2.

TABLE 2

| Beck's smoothness on second side [sec] | Charger bias coefficient |
|---|---|
| 60 or more | 0.68 |
| 57 to 59 | 0.76 |
| 54 to 56 | 0.84 |
| 51 to 53 | 0.92 |
| 50 | 1 |
| 42 to 49 | 1.08 |
| 34 to 41 | 1.16 |
| 26 to 33 | 1.24 |
| 20 to 25 | 1.32 |
| Less than 20 | 1.34 |

The charger bias coefficient in Table 2 is a coefficient to be multiplied to the current target value of a charger bias supplied to the transfer charger (47). By the multiplication, the current value supplied to the transfer charger, and consequently, the amount of charge applied to the transfer paper P in the second transfer portion is changed.

In the copying machine, as shown in Table 2, as the surface smoothness on the second side deteriorates, a larger current is supplied to the transfer charger. Accordingly, as the surface smoothness on the second side of the transfer paper deteriorates, a larger amount of charge is applied in the second transfer portion, to reduce insufficient transfer of the second visual image due to deterioration of the surface smoothness.

The configuration of the copying machine according to a second example of the embodiment is the same as that of the first example of the embodiment, unless otherwise specified.

In FIG. 1, in the first transfer portion, the secondary transfer current from the secondary transfer roller 46 to the support roller 28 is subjected to the constant current control, at the second transfer nip where the first intermediate transfer belt 21 and the secondary transfer roller 46 abut against each other. Therefore, in the first transfer portion, the secondary transfer field having a desired intensity is formed, regardless of the surface electrical resistance on the first and the second sides of the transfer paper P. In other words, in the transfer by the transfer nip method, if the constant current control is performed, fluctuations in the transferability due to the surface electrical resistance of the transfer paper P can be prevented.

On the other hand, in the second transfer portion, not the transfer nip method but the charger method is adopted. In the charger method, the electric charge applied to one surface of the transfer paper P by the transfer charger 47 is allowed to remain on the surface, and a transfer field is formed between the surface and the image carrier (in the shown example, the second intermediate transfer belt 31). Due to the transfer field, the visual image on the image carrier is electrostatically transferred onto the other surface. In such a charger method, as the surface electrical resistance on the surface applied with the electric charge by the transfer charger 47 decreases, the amount of charge that can remain on the surface decreases, and hence, the intensity of the transfer field is weakened. Accordingly, the transferability deteriorates. In other words, in the transfer by the charger method, the transferability changes due to the surface electrical resistance of the transfer paper P. In the copying machine according to the first example of the embodiment, the transferability of the second visual image to the second side deteriorates due to the surface electrical resistance on the first side of the transfer paper P. Therefore, in the copying machine according to the second example of the embodiment, for the transfer in the second transfer portion, the applied amount of electric charge by the transfer charger 47 is also adjusted by the surface electrical resistance on the first side of the transfer paper P.

Figure 9:
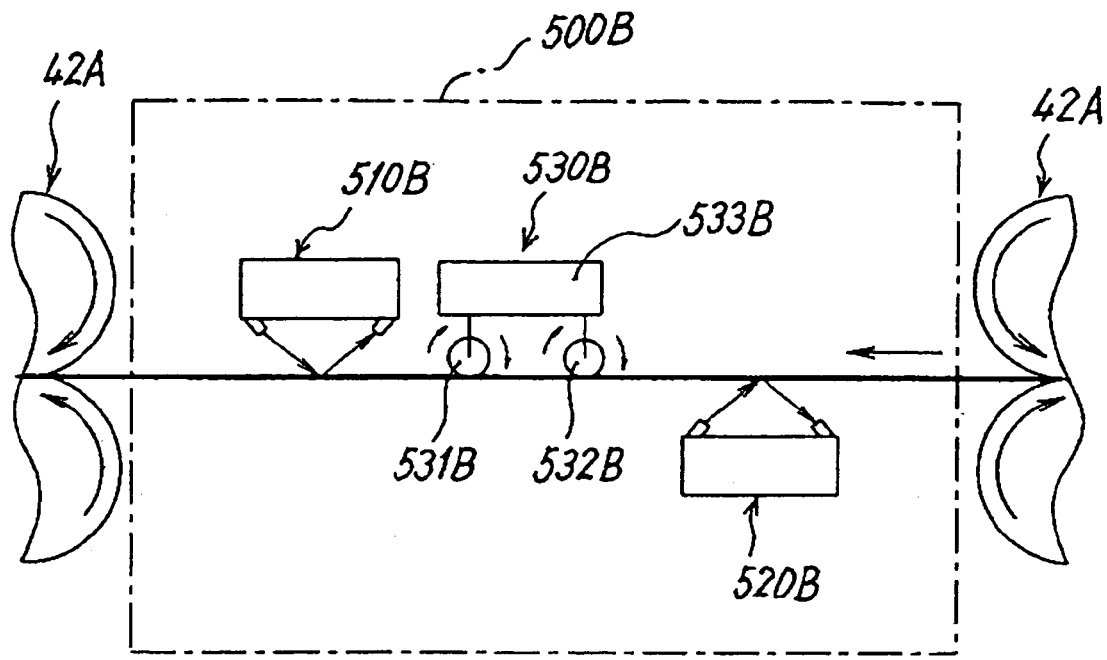
FIG. 9 is an enlarged block diagram of a compound sensor unit used for a copying machine according to a second example of the embodiment.

FIG. 9 is an enlarged block diagram of a compound sensor unit 500B as the surface characteristic detector used for the copying machine. In this figure, the compound sensor unit 500B includes a first detector 510B, a first supplementary detector 530B as the first side characteristic detector, and a second detector 520B. Among these, the first detector 510B has the same configuration as that of the first detector (510A) in the optical sensor unit in the first example of the embodiment, and detects the surface smoothness on the first side of the transfer paper P by a reflecting type photosensor. The second detector 520B has the same configuration as that of the second detector (520A) in the optical sensor unit in the first example of the embodiment, and detects the surface smoothness on the second side by a reflecting type photosensor. As shown FIG. 9, the second detector 520B is arranged at a position not facing the first detector 510B and the first supplementary detector 530B.

The first supplementary detector 530B has a current detector 533B, an output roller 531B and an input roller 532B supported by the current detector 533B so as to be freely driven and rotated. The rollers 531B and 532B are respectively made of a conductive metal material. The rollers 531B and 532B are disposed in a paper feeding direction with a predetermined distance, and correspondingly rotate with making a contact on a fist surface of the transfer paper P. A voltage V of a predetermined value is applied to between the output roller 531B and the input roller 532B. An electric current is then generated between the both rollers via the first side of the transfer paper P. The current detector 533B detects a current value I generated between the both rollers according to a known technique. The current value I has a correlation with the surface electrical resistance R on the first side of the transfer paper P (R=V/I). Therefore, the first supplementary detector 530B can detect the surface electrical resistance R, which is the surface characteristic on the first side of the transfer paper P.

One example of the relation between the surface smoothness on the second side and the second transfer condition of the transfer paper P in the copying machine is shown in Table 3.

TABLE 3

| Beck's smoothness on second side [sec] | First coefficient of charger bias | Surface resistance on first side [Ω/□] | Second coefficient of charger bias |
| --- | --- | --- | --- |
| 60 or more | 0.68 | $1 \times 10^{13}$ | 0.80 |
| 57~59 | 0.76 | $5 \times 10^{12}$ | 0.85 |
| 54~56 | 0.84 | $1 \times 10^{12}$ | 0.90 |
| 51~53 | 0.92 | $5 \times 10^{11}$ | 0.95 |
| 50 | 1 | $1 \times 10^{11}$ | 1 |
| 42~49 | 1.08 | $5 \times 10^{10}$ | 1.05 |
| 34~41 | 1.16 | $1 \times 10^{10}$ | 1.10 |
| 26~33 | 1.24 | $5 \times 10^{9}$ | 1.15 |
| 20~25 | 1.32 | $1 \times 10^{9}$ | 1.20 |
| Less than 20 | 1.34 | $1 \times 10^{9}$ | 1.25 |

In the copying machine, the voltage target value of the charger bias is corrected by multiplication of a first coefficient of charger bias and a second coefficient of charger bias. Among these coefficients, the former is a numerical value increasing or decreasing according to the surface smoothness on the second side of the transfer paper P as in the first example of the embodiment. The latter is a numerical value increasing or decreasing according to the surface electrical resistance on the first side of the transfer paper P. By determining the voltage target value by the multiplication of these two coefficients, the second transfer condition in the second transfer portion can be set to a content more suitable to the surface characteristics of the first and the second sides. Accordingly, for the second visual image, insufficient transfer resulting from the surface electrical resistance on the first side can be reduced, in addition to insufficient transfer resulting from the surface smoothness on the second side.

The second detector 520B detects the optical reflectance on the second side, while the first supplementary detector 530B detects the surface electrical resistance on the first side based on the current flowing to the first side of the transfer paper P. These detectors detect signals different from each other, that is, the current and the reflectance. In such a case, even when the respective detectors are arranged in any relationship, interference with each other hardly occurs. Therefore, it is not necessary to concern about the positions of the first supplementary detector 530B and the second detector 520B.

The configuration of the copying machine according to a third example of the embodiment is the same as that of the second example of the embodiment, unless otherwise specified.

FIG. 10 is an enlarged block diagram of the transfer portion in the copying machine. As shown in FIG. 10, in this copying machine, transfer by the charger method is performed not only in the second transfer portion but also in the first transfer portion. Specifically, in the first transfer portion, a first transfer charger 151 is arranged so as to face a position at which the first intermediate transfer belt 21 is spanned over the support roller 28, via a predetermined gap. The transfer paper (not shown) sent to the first transfer portion by the resist roller pair 45 is allowed to come in contact with the first intermediate transfer belt 21, while being guided by a first guide plate 150. At the time of passing through the area where the transfer paper faces the first transfer charger 151, electric charge is applied to the second side thereof, so that the first visual image on the first intermediate transfer belt 21 is transferred onto the first side. The transfer paper, on which the first visual image is transferred onto the first side is sent to the second transfer portion in which the transfer charger 47 and the second intermediate transfer belt 31 face each other, while being guided by a second guide plate 152, so that the second visual image on the second intermediate transfer belt 31 is transferred onto the second side.

Figure 11:
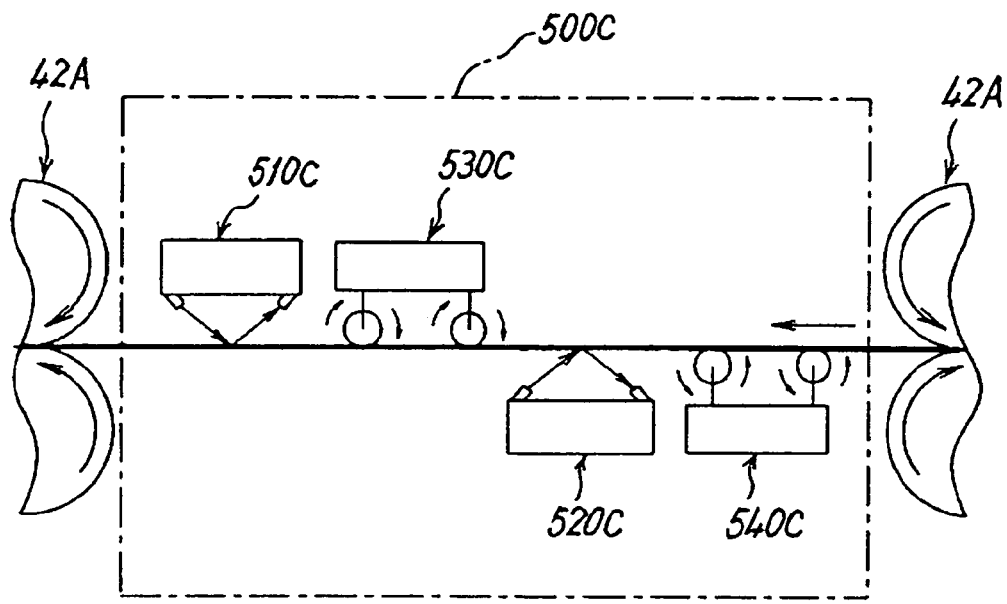
FIG. 11 is an enlarged block diagram of the compound sensor unit used for the copying machine.

FIG. 11 is an enlarged block diagram of a compound sensor unit 500C as the surface characteristic detector used in this copying machine. The compound sensor unit 500C includes a first detector 510C, a first supplementary detector 530C as the first side characteristic detector, a second detector 520C, and a second supplementary detector 540C as the second side characteristic detector. Among these, the first detector 510C and the second detector 520C respectively have the same configuration as those of the first detector (510B) and the second detector (520B) in the optical sensor unit in the second example of the embodiment, and detect the surface smoothness of the transfer paper P by a reflecting type photosensor. The first supplementary detector 530C has the same configuration as that of the first supplementary detector (530B) in the optical sensor unit in the first example of the embodiment, and detects the surface electrical resistance on the first side of the transfer paper P. The second supplementary detector 540C has the same configuration as that of the first supplementary detector 530C, except that it detects the surface electrical resistance on the second side of the transfer paper P. The compound sensor unit 500C having such a configuration can detect, respectively, the surface smoothness and the surface electrical resistance on the first and the second sides of the transfer paper P.

The first detector 510C and the second detector 520C respectively detect the surface smoothness based on the reflected light amount on the respective surfaces, that is, detect the surface smoothness based on the same type of signal. In this case, as in the first example of the embodiment, a large interference can occur between the both detectors according to the positions thereof. Therefore, in this copying machine, the both detectors are arranged at positions shifted from the positions where a large interference occurs. Specifically, at a position shifted from an extension line of the optical axis of light emitted from the light-emitting elements (511C or 521C) of one detector, the light-receiving element (512C or 522C) of the other detector is positioned. Accordingly, interference between the both detectors (510C, 520C) can be suppressed.

The first supplementary detector 530C and the second supplementary detector 540C are respectively for detecting the surface characteristics of the paper surface, based on the surface current flowing to the paper surface. That is, the both detectors detect the surface characteristics based on the same type of signal. In this case, a large interference can occur between the both detectors (530C and 540C) according to the positions thereof. In the case of the first supplementary detector 530C and the second supplementary detector 540C as shown in FIG. 11, a position described below becomes a position where a large interference occurs between these detectors, that is, a position where the electric current flows more easily than between the output roller 531C as the first electrode and the input roller 532C as the second electrode in the first supplementary detector 530C, from one of the electrodes to either one of the two electrodes in the second supplementary detector 540C. Furthermore, another position is a position where the electric current flows more easily than between the output roller 541C as the third electrode and the input roller 542C as the fourth electrode in the second supplementary detector 540C, from one of the electrodes to either one of the two electrodes in the first supplementary detector 530C. More specifically, the positions thereof are as described below. That is, there are six combinations set up by selecting two from four electrodes, that is, the output roller 531C and the input roller 532C in the first supplementary detector 530C, and the output roller 541C and the input roller 542C in the second supplementary detector 540C. The positions thereof are such that the distance between electrodes in an electrode combination of the output roller 531C and the input roller 532C in the first supplementary detector 530C, and the distance between electrodes in an electrode combination of the output roller 541C and the input roller 542C in the second supplementary detector 540C become larger than the distance between electrodes in other four electrode combinations, among these six electrode combinations.

In this copying machine, therefore, the both detectors are arranged such that the distance between electrodes in the electrode combination of the output roller 531C and the input roller 532C in the first supplementary detector 530C, and the distance between electrodes in the electrode combination of the output roller 541C and the input roller 542C in the second supplementary detector 540C become smaller than the distance between electrodes in other four electrode combinations. Accordingly, the interference between the both detectors can be suppressed.

The setting of the second transfer condition in the second transfer portion is the same as in the second example of the embodiment. Furthermore, in this copying machine, the first transfer condition in the first transfer portion is set in the same manner as in the second transfer portion. Specifically, the transfer bias with respect to the first transfer charger (151) is corrected by multiplication of a first coefficient of the charger bias corresponding to the surface smoothness on the first side. Furthermore, the transfer bias with respect to the first transfer charger is corrected by multiplication of a second coefficient of the charger bias corresponding to the surface electrical resistance of the second side. According to such setting, insufficient transfer resulting from the surface electrical resistance can be suppressed in addition to insufficient transfer resulting from the surface smoothness, for the first and the second visual images.

The configuration of the copying machine according to a fourth example of the embodiment is the same as that of the first example of the embodiment, unless otherwise specified.

FIG. 12 is an enlarged block diagram of the transfer portion of the copying machine. In the copying machine, transfer by the transfer nip method is performed in the first transfer portion and the second transfer portion. In FIG. 12, a first roller 153 in the first transfer portion and a first roller 154 in the second transfer portion arranged adjacent to each other are first belt stretching rollers, over which the first intermediate transfer belt 21 is spanned. A second roller 155 in the first transfer portion and a second roller 156 in the second transfer portion arranged adjacent to each other are second belt stretching rollers, over which the second intermediate transfer belt 31 is spanned.

In FIG. 12, for the convenience sake, the both first and second intermediate transfer belts (21 and 31) are shown away from each other, but actually, the both intermediate transfer belts abut against each other in the first transfer portion and the second transfer portion. Specifically, in the first transfer portion, the first roller 153 in the first transfer portion, over which the first intermediate transfer belt 21 is spanned, and the second roller 155 in the first transfer portion, over which the second intermediate transfer belt 31 is spanned, put the both intermediate transfer belts (21, 31) therebetween. Furthermore, in the second transfer portion, the first roller 154 in the second transfer portion, over which the first intermediate transfer belt 21 is spanned, and the second roller 156 in the second transfer portion, over which the second intermediate transfer belt 31 is spanned, put the both intermediate transfer belts (21, 31) therebetween. The extensional portion between the first roller 153 in the first transfer portion and the first roller 154 in the second transfer portion in the first intermediate transfer belt 21 abuts against the extensional portion between the second roller 155 in the first transfer portion and the second roller 156 in the second transfer portion in the second intermediate transfer belt 31.

In the first transfer portion, the second roller 155 in the first transfer portion, over which the second intermediate transfer belt 31 is spanned, is connected to the ground. A negative secondary transfer bias of the same polarity as the toner is applied to the first roller 153 in the first transfer portion, over which the first intermediate transfer belt 21 is spanned. An electric field acts on the first visual image and second visual image of the negative polarity, which are carried on the transfer paper P put between the both intermediate transfer belts, so as to electrostatically push the transfer paper P out from the first roller 153 in the first transfer portion to the second roller 155 in the first transfer portion. The first visual image on the first intermediate transfer belt 21 is secondary-transferred onto the first side of the transfer paper P by such an electrostatic push-out method. At this time, since an electrostatic force in the opposite direction from the second side of the transfer paper P to the second intermediate transfer belt 31 acts on the second visual image on the second intermediate transfer belt 31, the second visual image is still held on the surface of the second intermediate transfer belt 31.

On the other hand, the first roller 154 in the second transfer portion, over which the first intermediate transfer belt 21 is spanned, is connected to the ground in the second transfer portion. A negative secondary transfer bias of the same polarity is applied to the second roller 156 in the second transfer portion, over which the second intermediate transfer belt 31 is spanned. An electric field acts on the second visual image held on the second side of the transfer paper P, so as to electrostatically push the transfer paper P out from the second roller 156 in the second transfer portion to the first roller 154 in the second transfer portion. The second visual image on the second intermediate transfer belt 31 is secondary-transferred onto the second side of the transfer paper P by such an electrostatic push-out method. At this time, an electrostatic force directed from the first side to the first intermediate transfer belt 21 acts on the first visual image transferred onto the first side beforehand in the first transfer portion. However, even such an electrostatic force is allowed to act thereon, the first visual image on the first side has never been reverse-transferred onto the first intermediate transfer belt 21. According to experiments performed by the present inventor, in the second transfer portion, in which transfer process is performed later, if the following transfer is performed, reverse transfer can be prevented. That is, a transfer in which the visual image is electrostatically pushed out from the transfer bias member, which applies the transfer bias, toward an opposite member opposite thereto, that is, a transfer by the electrostatic push-out method needs only to be performed. In the first transfer portion, either method of the electrostatic push-out method and an electrostatic attracting method in which the visual image is electrostatically attracted toward the transfer bias member can be used. However, if the electrostatic attracting method is performed in the second transfer portion, reverse transfer occurs.

In this copying machine, as shown in Table 1, the target value of the secondary transfer current in the first transfer portion is corrected by multiplication of a coefficient of current target value according to the surface smoothness on the first side of the transfer paper P. The target value of the transfer pressure in the first transfer portion is also corrected by multiplication of a coefficient of transfer pressure corresponding to the surface smoothness on the first side. Further for the second transfer portion, the transfer current target value and the transfer pressure target value are corrected based on the surface smoothness on the second side.

The configuration of the copying machine according to a fifth example of the embodiment is the same as that of the first example of the embodiment, unless otherwise specified.

FIG. 13 is an enlarged block diagram of the transfer portion in the copying machine. In the copying machine, the transfer by the transfer nip method is performed in the first transfer portion and the second transfer portion. However, the electric field is not formed at the transfer nip. The first visual image and the second visual image are heated instead. The first visual image and the second visual image are heated and transferred onto the first side and the second side due to softening of the toner by heating.

In the first transfer portion, a first heating roller 157, over which the first intermediate transfer belt 21 is spanned, and a first pressing roller 158 form a first-heated transfer nip, putting the first intermediate transfer belt 21 therebetween.

On the other hand, in the second transfer portion, a second heating roller 160, over which the second intermediate transfer belt 31 is spanned, and a second pressing roller 159 form a second heated transfer nip, putting the second intermediate transfer belt 31 therebetween.

The first heating roller 157 and the second heating roller 160 respectively include a heat generation source such as a halogen lamp, and the surface temperature thereof is adjusted by turning ON/OFF of the power source to the heat generation source. The transfer paper P transferred from the resist roller pair 45 is put between the first heated transfer nip. The first side thereof is heated by the first heating roller 157 via the first intermediate transfer belt 21. The transfer paper P is then transferred from the first heated transfer nip to the second heated transfer nip. The second side thereof is heated by the second heating roller 160.

As the heating temperature on the first side by the first heating roller 157 becomes high, the toner in the first visual image is softened, and the transferability of the first visual image at the first heating nip is improved. Furthermore, as the transfer pressure at the first transfer nip increases, the transferability of the first visual image at the first heating nip is improved. That is, in the copying machine, the first transfer condition at the time of transferring the first visual image is set by setting the heating temperature by the first heating roller 157 and the transfer pressure at the first heating nip.

Likewise, as the heating temperature on the second side by the second heating roller 160 becomes high, the toner in the second visual image is softened, and the transferability of the second visual image at the first heating nip is improved. Furthermore, as the transfer pressure at the second transfer nip increases, the transferability of the second visual image at the second heating nip is improved. That is, in the copying machine, the second transfer condition at the time of transferring the second visual image is set by setting the heating temperature by the second heating roller 160 and the transfer pressure at the second heating nip.

In the copying machine, the heating temperature on the first side by the first heating roller 157 and the transfer pressure in the first transfer portion are set based on the surface smoothness on the first side of the transfer paper P. Specifically, as the surface smoothness on the first side deteriorates, the surface temperature of the first heating roller 157 is set high, and the transfer pressure in the first transfer portion is also set high. The heating temperature on the second side by the second heating roller 160 and the transfer pressure in the second transfer portion are also set based on the surface smoothness on the second side of the transfer paper P. Specifically, as the surface smoothness on the second side deteriorates, the surface temperature of the second heating roller 160 is set high, and the transfer pressure in the second transfer portion is also set high. Accordingly, as the surface smoothness deteriorates, the visual image is heated to a higher temperature and transferred onto the transfer paper P, thereby suppressing insufficient transfer resulting from fluctuations in the surface smoothness. Furthermore, as the surface smoothness deteriorates, insufficient transfer resulting from fluctuations in the surface smoothness can be suppressed, also by heating and transferring the visual image at a higher transfer pressure.

In the case of heating transfer, the surface electrical resistance of the transfer paper P does not affect the transferability of the visual image. Therefore, as in the case that the transfer nip method and the electrostatic transfer method are used together, it is not necessary to take the surface electrical resistance of the transfer paper P into consideration.

The configuration of the copying machine according to a sixth example of the embodiment is the same as that of the first example of the embodiment, unless otherwise specified.

Figure 14:
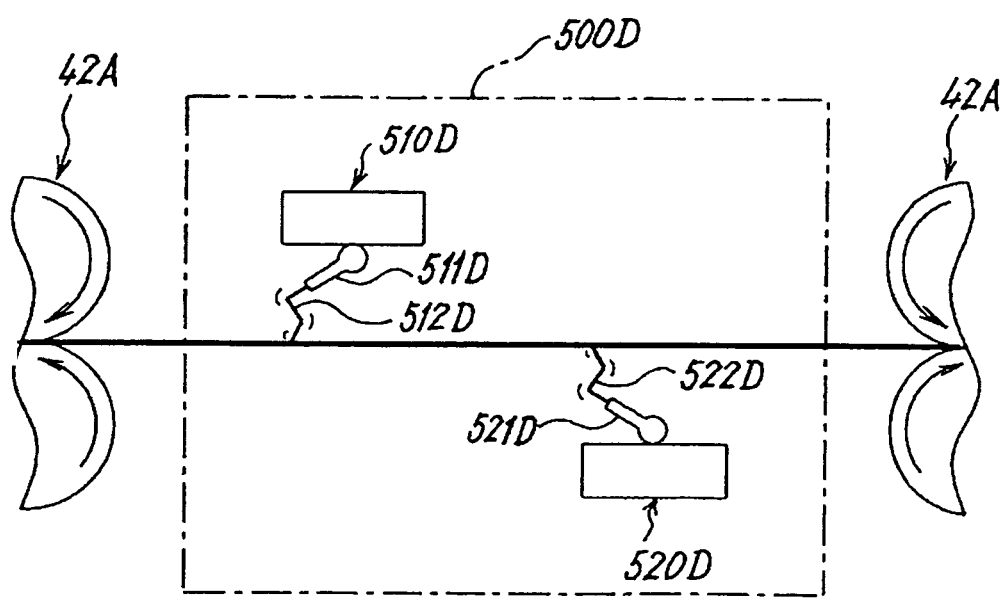
FIG. 14 is an enlarged block diagram of a vibration sensor unit used for a copying machine according to a sixth example of the embodiment.

FIG. 14 is an enlarged block diagram of a vibration sensor unit 500D as a surface characteristic detector used for the copying machine. The vibration sensor unit 500D includes a first detector 510D as the first side characteristic detector, and a second detector 520D as the second side characteristic detector. The both detectors are arranged at positions not facing each other, putting the carrier path therebetween.

The first detector 510D supports the rear end of a first contact member 512D in a flat spring shape by a support member 511D. The first contact member 512D is vibrated by slidingly rubbing the end of the first contact member 512D against the first side of the transfer paper P carried in the carrier path. The vibration of the first contact member 512D is converted to an electric signal by a known technique. The first detector 510D outputs a signal corresponding to the vibration amount of the first contact member 512D. The vibration amount of the first contact member 512D has a correlation with the surface smoothness on the first side of the transfer paper P. Therefore, the first detector 510D functions as a surface smoothness detector that detects the surface smoothness on the first side, and also functions as a first vibration detector that detects the vibration amount of the first contact member 512D. Likewise, the second detector 520D functions as a second vibration detector that detects the vibration amount of the second contact member 522D.

The first detector 510D and the second detector 520D detect the surface smoothness on the paper surface based on the vibration of the contact members (512D, 522D) respectively brought into contact with the paper surface. That is, the first detector 510D and the second detector 520D detect the surface characteristics based on the same type of signal. In such a case, the both detectors largely interfere with each other according to the positions of the both detectors, thereby causing a detection error of the surface smoothness. The positions at which these detectors interfere with each other most strongly is a position where a projected image in the thickness direction of the transfer paper in a contact area of the first contact member 512D and the first side overlaps on a contract area of the second contact member 522D and the second side. At such a position, since the both contact members come in contact with each other via the transfer paper P, vibration of one detector is transmitted to the other most easily. That is, the interference between the both detectors increases most. In the copying machine, therefore, the both detectors are arranged so that the projected image in the thickness direction of the transfer paper in the former contact area does not overlap on the latter contact area. Accordingly, interference between the both detectors can be reduced.

In the copying machine, the first transfer condition is set in the relation shown in Table 1, based on the detection result of the first side by the first detector 510D. The second transfer condition is set in the relation shown in Table 2, based on the detection result of the second side by the second detector 520D.

In the respective examples explained above, if setting of the transfer condition with respect to one surface of the transfer paper P is fixed, a difference in image quality between the both sides becomes conspicuous, due to a difference in the surface characteristics of the front and the back sides.

While the example in which the present invention is applied to an electrophotographic printer has been explained, the invention is also applicable to an image forming apparatus that forms the visual image by other methods such as a direct recording method. The direct recording method is a method for directly forming a visual image with respect to a recording medium or an intermediate recording medium by allowing the toner group jetted in dots from a toner jet unit to adhere directly on the recording medium or the intermediate recording medium to form a pixel image.

In the copying machine in respective examples, for at least one of the first side characteristic detector and the second side characteristic detector, the one that detects the surface smoothness, which is one of the surface characteristics of the transfer paper, is used. In such a configuration, a difference in image quality on the front and the back sides due to a difference in surface smoothness on the front and the back sides of the transfer paper P can be suppressed.

In the copying machines according to the examples 1 to 5, as the first side characteristic detector, the second side characteristic detector, or both, the one that detects the surface smoothness on the surface of the transfer paper P by detecting the optical reflectance on the first side or the second side of the transfer paper P is used. In such a configuration, the surface smoothness can be detected in a non-contact manner.

In the copying machine according to the sixth example of the embodiment, as the first side characteristic detector, the second side characteristic detector, or both, the one that detects the vibration amount of the contact members (512D, 522D), which come in contact with the first side or the second side thereof, is used. In such a configuration, different from the one detecting the surface smoothness based on the optical reflectance, the surface smoothness can be detected without causing deterioration in the detection accuracy due to the light leaked in from the outside of the housing of the printer unit.

In the copying machines according to the examples 1, 2, 4, 5, and 6, for at least one of the transfer method at the time of transferring the first visual image onto the first side of the transfer paper P and the transfer method at the time of transferring the second visual image onto the second side, the transfer nip method is employed, in which the second transfer roller 46 as an abutment member, the first intermediate transfer belt 21, the second intermediate transfer belt 31, the first pressing roller 158, or the second pressing roller 159 are made to abut against the image carrier (the first intermediate transfer belt 21 or the second intermediate transfer belt 31) carrying the first visual image or the second visual image on the endlessly moving surface thereof, to form a transfer nip, and the first visual image or the second visual image is transferred to the transfer paper P, held by the transfer nip. In this configuration, since the visual image on the image carrier is transferred onto the transfer paper P, while the transfer paper P held by the transfer nip is reliably adhered to the image carrier, insufficient transfer due to insufficient adhesion can be suppressed.

In the copying machines according to the examples 1, 2, 4, and 6, the transfer-condition setting unit is configured so as to set the field strength at the transfer nip, as the transfer condition in the transfer by the transfer nip method, and hence, the transferability of the visual image at the transfer nip can be stabilized by changing the field strength according to the surface characteristics of the transfer paper P, regardless of the surface characteristics.

In the copying machines according to the examples 1, 2, 4, 5, and 6, the transfer-condition setting unit is configured so as to set the transfer pressure at the transfer nip as the transfer condition in the transfer by the transfer nip method, and hence, the transferability of the visual image at the transfer nip can be stabilized by changing the transfer pressure according to the surface characteristics of the transfer paper P, regardless of the surface characteristics.

In the copying machines according to the examples 1, 2, 4, 5, and 6, the transfer-condition setting unit is configured so as to set the nip length at the transfer nip as the transfer condition in the transfer by the transfer nip method, and hence, the transferability of the visual image at the transfer nip can be stabilized by changing the transfer time according to the surface characteristics of the transfer paper P, regardless of the surface characteristics.

In the copying machines according to the examples 1, 2, 3, and 6, a charger method in which an electric charge is applied to the transfer paper P held on the surface of the image carrier by the transfer charger (47, 151), which is an electric charge-applying unit facing the image carrier (the first intermediate transfer belt 21 or the second intermediate transfer belt 31) carrying the first visual image or the second visual image on an endlessly moving surface thereof, with a predetermined interval, to transfer the first visual image or the second visual image on the image carrier onto the transfer paper P, is employed for at least one of the transfer method at the time of transferring the first visual image onto the first side of the transfer paper P and the transfer method at the time of transferring the second visual image onto the second side. Accordingly, the visual image can be transferred onto the surface, which is a transfer object, without bringing any member into contact with the surface opposite to the surface of the transfer paper P, which is the transfer object.

In the copying machine according to the sixth example of the embodiment, for at least one of the first characteristics detector and the second characteristics detector, the one detecting the surface electrical resistance, which is one of the surface characteristics, is used, and the transfer-condition setting unit is configured so as to set the applied amount of charge by the transfer charger (47, 151) in at least one of these detectors, based on the detection result of the surface electrical resistance, as the transfer condition by the charger method. In such a configuration, the transferability can be prevented from being unstable due to fluctuations in the surface electrical resistance of the transfer paper P.

According to the present invention, as the first side characteristic detector that detects the characteristics of the first side of the recording medium, the first side smoothness detector or the first side electrical resistance detector is provided. Specifically, the first-side reflected-light detector that detects light reflected on the first side detects the surface smoothness on the first side based on the optical reflectance on the first side. The first-side current detector that detects the electric current generated on the first side detects the surface electrical resistance on the first side based on the current value on the first side. Furthermore, the first vibration detector that detects the vibration amount of a contact member coming in contact with the first side detects the surface smoothness on the first side based on the vibration amount. In the present invention, as the second side characteristic detector that detects the characteristics of the second side of the recording medium, the second side smoothness detector or the second side electrical resistance detector is provided, which detect the surface smoothness in the same manner as the first side characteristic detector. The transfer-condition setting unit then sets the first transfer condition at the time of transferring the first visual image onto the first side of the recording medium to a condition suitable for the surface characteristics of the first or the second side of the recording medium. For example, if the surface smoothness on the first side is relatively low, the adhesiveness between the first side and the image carrier decreases, thereby decreasing the transferability of the first visual image. In such a case, the first transfer condition is set so as to increase the transferability. For example, when transfer by the charger method is adopted, if the surface electrical resistance on the second side is relatively low, the electric charge held on the second side decreases, and hence, the electrostatic transferability of the first visual image from the image carrier toward the first side decreases. In such a case, the first transfer condition is set so that much electric charge can be applied to the second side by the electric charge-applying unit. On the other hand, the second transfer condition at the time of transferring the second visual image onto the second side of the recording medium is set to a condition suitable for the surface characteristics detected by the first side characteristic detector and the second side characteristic detector. Insufficient transfer can be suppressed on the first side and the second side by setting the first transfer condition and the second transfer condition in this manner, and a difference in image quality between the first and the second sides due to degradation of image resulting from insufficient transfer occurring on either surface of the recording medium can be suppressed.

Furthermore, according to the present invention, the interference with each other increases most when the first-side reflected-light detector and the second-side reflected-light detector are arranged such that a light-receiving unit in one detector is positioned on an extension line of the outgoing direction of light from a light-emitting unit in the other detector. It is because if the light from one light-emitting unit transmits through the recording medium, the transmitted light volume increases most on the extension line in the outgoing direction of the light. Therefore, the first-side reflected-light detector and the second-side reflected-light detector are arranged such that at positions shifted from the extension line in the outgoing direction of the light-emitting unit in one of the reflected light detectors, the light-receiving unit in the other reflected light detector is positioned. Accordingly, interference between the first-side reflected-light detector and the second-side reflected-light detector can be suppressed, thereby reliably suppressing a difference in image quality between the front and the back sides of the recording medium.

Moreover, according to the present invention, if the electric current flows more easily between one of the first and the second electrodes in the first-side current detector and one of the third and the fourth electrodes in the second-side current detector, than between the first and the second electrodes in the first-side current detector, the first-side current detector and the second-side current detector interfere with each other strongly. If it is assumed that there is no electrical resistance on the recording medium, when either one of the distance between electrodes in an electrode combination of the first and the second electrodes and the distance between electrodes in an electrode combination of the third and the fourth electrodes becomes larger than the distance between electrodes in other four electrode combinations, of six combinations set up by selecting two from the first, the second, the third, and the fourth electrodes, such interference occurs. Therefore, the first-side current detector and the second-side current detector are arranged such that the distance between electrodes in the electrode combination of the first and the second electrodes, and the distance between electrodes in the electrode combination of the third and the fourth electrodes become smaller than the distance between electrodes in other four electrode combinations of the six electrode combinations. Accordingly, interference between the first-side current detector and the second-side current detector can be suppressed, thereby reliably suppressing a difference in image quality between the front and the back sides of the recording medium.

Furthermore, according to the present invention, when the first contact member and the second contact member are arranged so as to put the recording medium therebetween, interference between the first vibration detector and the second vibration detector becomes strongest. It is because the vibration-conducting amount from one contact member to the other increases most in such an arrangement. Therefore, the both contact members area arranged at positions where a projected image in the thickness direction of the recording medium in a contact area of the first contact member and the first side does not overlap on a contract area of the second contact member and the second side, thereby avoiding such a situation that the recording medium is put between the both contact members. Accordingly, interference between the first vibration detector and the second vibration detector can be suppressed, thereby reliably suppressing a difference in image quality between the front and the back sides of the recording medium.

Moreover, according to the present invention, the first side characteristic detector and the second side characteristic detector detect any one of the optical signal, the current signal, and the vibration signal and different from each other. In such detection, different from an instance in which the same type of signal (optical signal, current signal, or vibration signal) is detected, interference between the both characteristic detectors hardly occurs due to inappropriate positions of the first side characteristic detector and the second side characteristic detector. Accordingly, interference between the both characteristic detectors can be suppressed, as compared to the instance in which the same type of signal is detected, thereby reliably suppressing a difference in image quality between the front and the back sides of the recording medium.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A duplex transferring apparatus that transfers a first visual image from a first image carrier onto a first side of a recording medium and a second visual image from a second image carrier onto a second side of the recording medium, to transfer a visual image onto both sides of the recording medium, the duplex transferring apparatus comprising:
   a first-side reflected-light detector including
      a first light-emitting unit that emits a first light; and
      a first light-receiving unit that receives the first light reflected on the first side of the recording medium;
   a second-side reflected-light detector including
      a second light-emitting unit that emits a second light; and
      a second light-receiving unit that receives the second light reflected on the second side of the recording medium; and
   a transfer-condition setting unit that independently sets a first transfer condition for transferring the first visual image and a second transfer condition for transferring the second visual image, based on a result of detections by the first-side reflected-light detector and the second-side reflected-light detector, wherein
   the first-side reflected-light detector and the second-side reflected-light detector are arranged in such a manner that the first light-receiving unit is fixed at a position off from an extension line from the second light-emitting unit in an emitting direction of the second light-emitting unit, and the second light-receiving unit is fixed at a position off from an extension line from the first light-emitting unit in an emitting direction of the first light-emitting unit.

2. The duplex transferring apparatus according to claim 1, wherein
   a transfer nip method is employed for at least one of transferring the first visual image onto the first side and transferring the second visual image onto the second side, and
   the transfer nip method includes
      forming a transfer nip by abutting an abutment member against the first image carrier or the second image carrier on an endlessly moving surface; and
      transferring the visual image onto a transfer medium held at the transfer nip.

3. The duplex transferring apparatus according to claim 2, wherein the transfer-condition setting unit sets a field strength at the transfer nip as a transfer condition in the transfer nip method.

4. The duplex transferring apparatus according to claim 2, wherein the transfer-condition setting unit sets s transfer pressure, which is a pressure at the transfer nip, as a transfer condition in the transfer nip method.

5. The duplex transferring apparatus according to claim 2, wherein the transfer-condition setting unit sets a nip length, which is a length of the transfer nip in a direction of transferring the recording medium, as a transfer condition in the transfer nip method.

6. A duplex transferring apparatus that transfers a first visual image from a first image carrier onto a first side of a recording medium and a second visual image from a second image carrier onto a second side of the recording medium, to transfer a visual image onto both sides of the recording medium, the duplex transferring apparatus comprising:
   a first-side current detector that detects a current generated between a first electrode and a second electrode by bringing the first electrode and the second electrode into contact with the first side of the recording medium with a predetermined distance between the first electrode and the second electrode;
   a second-side current detector that detects a current generated between a third electrode and a fourth electrode by bringing the third electrode and the fourth electrode into contact with the second side of the recording medium with a predetermined distance between the third electrode and the fourth electrode; and
   a transfer-condition setting unit that independently sets a first transfer condition for transferring the first visual image and a second transfer condition for transferring the second visual image, based on a result of detections by the first-side current detector and the second-side current detector, wherein
   the first-side current detector and the second-side current detector are arranged in such a manner that a distance between the first electrode and the second electrode and a distance between the third electrode and the fourth electrode become shorter than distances between electrodes in other four combinations out of six combinations set up by selecting two electrodes from the first electrode to the fourth electrode.

7. The duplex transferring apparatus according to claim 6, wherein
   a transfer nip method is employed for at least one of transferring the first visual image onto the first side and transferring the second visual image onto the second side, and
   the transfer nip method includes
      forming a transfer nip by abutting an abutment member against the first image carrier or the second image carrier on an endlessly moving surface; and
      transferring the visual image onto a transfer medium held at the transfer nip.

8. The duplex transferring apparatus according to claim 7, wherein the transfer-condition setting unit sets a field strength at the transfer nip as a transfer condition in the transfer nip method.

9. The duplex transferring apparatus according to claim 7, wherein the transfer-condition setting unit sets s transfer pressure, which is a pressure at the transfer nip, as a transfer condition in the transfer nip method.

10. The duplex transferring apparatus according to claim 7, wherein the transfer-condition setting unit sets a nip length, which is a length of the transfer nip in a direction of transferring the recording medium, as a transfer condition in the transfer nip method.

11. The duplex transferring apparatus according to claim 6, wherein
a charger method is employed for at least one of transferring the first visual image onto the first side and transferring the second visual image onto the second side, and
the transfer nip method includes
applying an electric charge to the recording medium held on the first image carrier or the second image carrier by an electric charge-applying unit arranged in opposite to the first image carrier or the second image carrier on an endlessly moving surface, in a predetermined distance; and
transferring the first visual image or the second visual image onto the recording paper.

12. The duplex transferring apparatus according to claim 11, wherein the transfer-condition setting unit sets an amount of the electric charge applied by the electric charge-applying unit with respect to a target side for a detection by the first-side current detector or the second-side current detector, based on a result of the detection by the first-side current detector or the second-side current detector, as a transfer condition in the charger method.

13. A duplex transferring apparatus that transfers a first visual image from a first image carrier onto a first side of a recording medium and a second visual image from a second image carrier onto a second side of the recording medium, to transfer a visual image onto both sides of the recording medium, the duplex transferring apparatus comprising:
a first-side vibration detector that detects a vibration amount of a first contact member by bringing the first contact member into contact with the first side of the recording medium;
a second-side vibration detector that detects a vibration amount of a second contact member by bringing the second contact member into contact with the second side of the recording medium; and
a transfer-condition setting unit that independently sets a first transfer condition for transferring the first visual image and a second transfer condition for transferring the second visual image, based on a result of detections by the first-side vibration detector and the second-side vibration detector, wherein
the first-side vibration detector and the second-side vibration detector are arranged in such a manner that a projected image of a contact area of the first contact member on the first side in a thickness direction of the recording medium does not overlap with a contract area of the second contact member on the second side.

14. The duplex transferring apparatus according to claim 13, wherein
a transfer nip method is employed for at least one of transferring the first visual image onto the first side and transferring the second visual image onto the second side, and
the transfer nip method includes
forming a transfer nip by abutting an abutment member against the first image carrier or the second image carrier on an endlessly moving surface; and
transferring the visual image onto a transfer medium held at the transfer nip.

15. The duplex transferring apparatus according to claim 14, wherein the transfer-condition setting unit sets a field strength at the transfer nip as a transfer condition in the transfer nip method.

16. The duplex transferring apparatus according to claim 14, wherein the transfer-condition setting unit sets s transfer pressure, which is a pressure at the transfer nip, as a transfer condition in the transfer nip method.

17. The duplex transferring apparatus according to claim 14, wherein the transfer-condition setting unit sets a nip length, which is a length of the transfer nip in a direction of transferring the recording medium, as a transfer condition in the transfer nip method.

18. A duplex transferring apparatus that transfers a first visual image from a first image carrier onto a first side of a recording medium and a second visual image from a second image carrier onto a second side of the recording medium, to transfer a visual image onto both sides of the recording medium, the duplex transferring apparatus comprising:
two units selected from
a reflected-light detector including a light-emitting unit that emits a light, and a light-receiving unit that receives the light reflected on either of the first side and the second side of the recording medium;
a current detector that detects a current generated between two electrodes by bringing the two electrodes into contact with either of the first side and the second side of the recording medium with a predetermined distance between the two electrodes; and
a vibration detector that detects a vibration amount of a contact member by bringing the contact member into contact with either of the first side and the second side of the recording medium; and
a transfer-condition setting unit that independently sets a first transfer condition for transferring the first visual image and a second transfer condition for transferring the second visual image, based on a result of detections by the two units.

19. The duplex transferring apparatus according to claim 18, wherein
a transfer nip method is employed for at least one of transferring the first visual image onto the first side and transferring the second visual image onto the second side, and
the transfer nip method includes
forming a transfer nip by abutting an abutment member against the first image carrier or the second image carrier on an endlessly moving surface; and
transferring the visual image onto a transfer medium held at the transfer nip.

20. The duplex transferring apparatus according to claim 19, wherein the transfer-condition setting unit sets a field strength at the transfer nip as a transfer condition in the transfer nip method.

21. The duplex transferring apparatus according to claim 19, wherein the transfer-condition setting unit sets s transfer pressure, which is a pressure at the transfer nip, as a transfer condition in the transfer nip method.

22. The duplex transferring apparatus according to claim 19, wherein the transfer-condition setting unit sets a nip length, which is a length of the transfer nip in a direction of transferring the recording medium, as a transfer condition in the transfer nip method.

23. The duplex transferring apparatus according to claim 18, wherein
a charger method is employed for at least one of transferring the first visual image onto the first side and transferring the second visual image onto the second side, and the transfer nip method includes
applying an electric charge to the recording medium held on the first image carrier or the second image carrier by an electric charge-applying unit arranged in opposite to the first image carrier or the second image carrier on an endlessly moving surface, in a predetermined distance; and
transferring the first visual image or the second visual image onto the recording paper.

24. The duplex transferring apparatus according to claim 23, wherein the transfer-condition setting unit sets an amount of the electric charge applied by the electric charge-applying unit with respect to a target side for a detection by the current detector, based on a result of the detection by the current detector, as a transfer condition in the charger method.

25. An image forming apparatus that forms a visual image on both sides of a recording medium, the image forming apparatus comprising:
an image forming unit that forms a first visual image on a first image carrier and a second visual image on a second image carrier; and
a duplex transfer unit that transfers a first visual image from a first image carrier onto a first side of the recording medium and a second visual image from a second image carrier onto a second side of the recording medium, wherein
the duplex transfer unit includes
a first-side reflected-light detector including a first light-emitting unit that emits a first light and a first light-receiving unit that receives the first light reflected on the first side of the recording medium;
a second-side reflected-light detector including a second light-emitting unit that emits a second light and a second light-receiving unit that receives the second light reflected on the second side of the recording medium; and
a transfer-condition setting unit that independently sets a first transfer condition for transferring the first visual image and a second transfer condition for transferring the second visual image, based on a result of detections by the first-side reflected-light detector and the second-side reflected-light detector, wherein
the first-side reflected-light detector and the second-side reflected-light detector are arranged in such a manner that the first light-receiving unit is fixed at a position off from an extension line from the second light-emitting unit in an emitting direction of the second light-emitting unit, and the second light-receiving unit is fixed at a position off from an extension line from the first light-emitting unit in an emitting direction of the first light-emitting unit.

26. An image forming apparatus that forms a visual image on both sides of a recording medium, the image forming apparatus comprising:
an image forming unit that forms a first visual image on a first image carrier and a second visual image on a second image carrier; and
a duplex transfer unit that transfers a first visual image from a first image carrier onto a first side of the recording medium and a second visual image from a second image carrier onto a second side of the recording medium, wherein
the duplex transfer unit includes
a first-side current detector that detects a current generated between a first electrode and a second electrode by bringing the first electrode and the second electrode into contact with the first side of the recording medium with a predetermined distance between the first electrode and the second electrode;
a second-side current detector that detects a current generated between a third electrode and a fourth electrode by bringing the third electrode and the fourth electrode into contact with the second side of the recording medium with a predetermined distance between the third electrode and the fourth electrode; and
a transfer-condition setting unit that independently sets a first transfer condition for transferring the first visual image and a second transfer condition for transferring the second visual image, based on a result of detections by the first-side current detector and the second-side current detector, wherein
the first-side current detector and the second-side current detector are arranged in such a manner that a distance between the first electrode and the second electrode and a distance between the third electrode and the fourth electrode become shorter than distances between electrodes in other four combinations out of six combinations set up by selecting two electrodes from the first electrode to the fourth electrode.

27. An image forming apparatus that forms a visual image on both sides of a recording medium, the image forming apparatus comprising:
an image forming unit that forms a first visual image on a first image carrier and a second visual image on a second image carrier; and
a duplex transfer unit that transfers a first visual image from a first image carrier onto a first side of the recording medium and a second visual image from a second image carrier onto a second side of the recording medium, wherein
the duplex transfer unit includes
a first-side vibration detector that detects a vibration amount of a first contact member by bringing the first contact member into contact with the first side of the recording medium;
a second-side vibration detector that detects a vibration amount of a second contact member by bringing the second contact member into contact with the second side of the recording medium; and
a transfer-condition setting unit that independently sets a first transfer condition for transferring the first visual image and a second transfer condition for transferring the second visual image, based on a result of detections by the first-side vibration detector and the second-side vibration detector, wherein
the first-side vibration detector and the second-side vibration detector are arranged in such a manner that a projected image of a contact area of the first contact member on the first side in a thickness direction of the recording medium does not overlap with a contract area of the second contact member on the second side.

28. An image forming apparatus that forms a visual image on both sides of a recording medium, the image forming apparatus comprising:
an image forming unit that forms a first visual image on a first image carrier and a second visual image on a second image carrier; and
a duplex transfer unit that transfers a first visual image from a first image carrier onto a first side of the recording medium and a second visual image from a second image carrier onto a second side of the recording medium, wherein
the duplex transfer unit includes
two units selected from a reflected-light detector including a light-emitting unit that emits a light, and a light-receiving unit that receives the light reflected on either of the first side and the second side of the recording medium;

a current detector that detects a current generated between two electrodes by bringing the two electrodes into contact with either of the first side and the second side of the recording medium with a predetermined distance between the two electrodes; and a vibration detector that detects a vibration amount of a contact member by bringing the contact member into contact with either of the first side and the second side of the recording medium; and a transfer-condition setting unit that independently sets a first transfer condition for transferring the first visual image and a second transfer condition for transferring the second visual image, based on a result of detections by the two units.

* * * * *